United States Patent [19]

Miki et al.

[11] Patent Number: 5,081,482
[45] Date of Patent: Jan. 14, 1992

[54] IC CARD AND CAMERA FOR USE THEREWITH

[75] Inventors: Yukio Miki; Mamoru Katsuragi; Hideo Kajita; Takeshi Matsumoto; Masayasu Hirano; Tetsuro Ohya; Tae Iida; Hidehiko Fujii; Nobuharu Murashima, all of Osaka, Japan

[73] Assignee: Minolta Camera Kabushiki Kaisha, Osaka, Japan

[21] Appl. No.: 693,087

[22] Filed: Apr. 30, 1991

Related U.S. Application Data

[63] Continuation of Ser. No. 351,828, May 15, 1989, abandoned.

[30] Foreign Application Priority Data

| May 16, 1988 | [JP] | Japan | 63-116892 |
| May 16, 1988 | [JP] | Japan | 63-116893 |
| May 16, 1988 | [JP] | Japan | 63-116895 |
| May 16, 1988 | [JP] | Japan | 63-116896 |
| May 16, 1988 | [JP] | Japan | 63-116898 |
| May 16, 1988 | [JP] | Japan | 63-116899 |
| May 16, 1988 | [JP] | Japan | 63-116900 |
| May 16, 1988 | [JP] | Japan | 63-118629 |

[51] Int. Cl.⁵ ............................................. G03B 17/02
[52] U.S. Cl. .................................... 354/288; 439/68
[58] Field of Search ............. 354/202, 152, 289.1, 354/288; 439/55, 59, 60, 61, 62, 68, 69

[56] References Cited

U.S. PATENT DOCUMENTS

| 4,286,849 | 9/1981 | Uchidoi et al. |
| 4,443,077 | 4/1984 | Tanikawa |
| 4,469,423 | 9/1984 | Bresson ............... 354/202 X |
| 4,477,164 | 10/1984 | Nakai et al. |
| 4,500,183 | 2/1985 | Tanikawa |
| 4,537,487 | 8/1985 | Taniguchi et al. |
| 4,573,786 | 3/1986 | Taniguchi et al. |
| 4,673,275 | 6/1987 | Nakai et al. |
| 4,699,491 | 10/1987 | Ishimura |
| 4,724,453 | 2/1988 | Hamano |
| 4,728,978 | 3/1988 | Inoue et al. |
| 4,733,258 | 3/1988 | Kojima |
| 4,733,265 | 3/1988 | Haraguchi et al. |
| 4,782,355 | 11/1988 | Sakai et al. |

FOREIGN PATENT DOCUMENTS

| 58-133124 | 8/1983 | Japan |
| 58-126521 | 9/1983 | Japan |
| 59-46085 | 3/1984 | Japan |
| 60-15885 | 1/1985 | Japan |
| 60-22794 | 2/1985 | Japan |
| 60-95784 | 5/1985 | Japan |
| 60-173789 | 9/1985 | Japan |
| 60-173790 | 9/1985 | Japan |
| 60-209989 | 10/1985 | Japan |
| 60-209990 | 10/1985 | Japan |
| 62-2383 | 1/1987 | Japan |
| 62-2702 | 1/1987 | Japan |
| 62-76370 | 4/1987 | Japan |
| 62-99044 | 6/1987 | Japan |
| 62-134779 | 6/1987 | Japan |

Primary Examiner—Brian W. Brown
Attorney, Agent, or Firm—Burns, Doane, Swecker & Mathis

[57] ABSTRACT

An IC card suitably adapted to a camera as a small size device and a camera to which such IC card can be mounted appropriately. The IC card is formed as a rectangular plate of a size of about 20 mm × 30 mm to 40 mm × 60 mm so that it may be mounted on a camera. Contents of the IC card are or can be indicated on a front surface of the IC card. A plurality of connecting terminals for electric connection to a camera are disposed in a row on a rear surface along an edge of the IC card. A camera for use with such IC card has an IC card accommodating means provided thereon. Where the camera is a single lens reflex camera, the means may be located sidewardly of a pentagonal roof prism accommodating section on the top of the camera and include a lid member for opening or closing a card accommodating section thereof. The means may be located otherwise on the bottom or a rear lid of the camera and include a member mounted for movement between a position accommodated in the camera and another position projecting from the camera.

37 Claims, 25 Drawing Sheets

F I G. 11
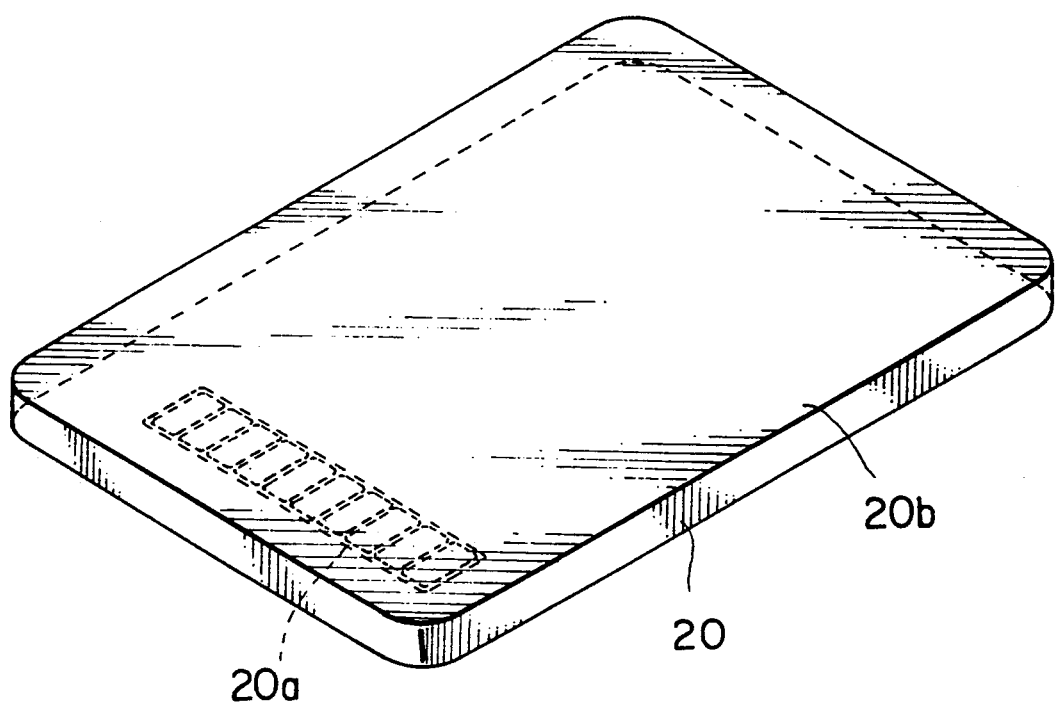
F I G. 12
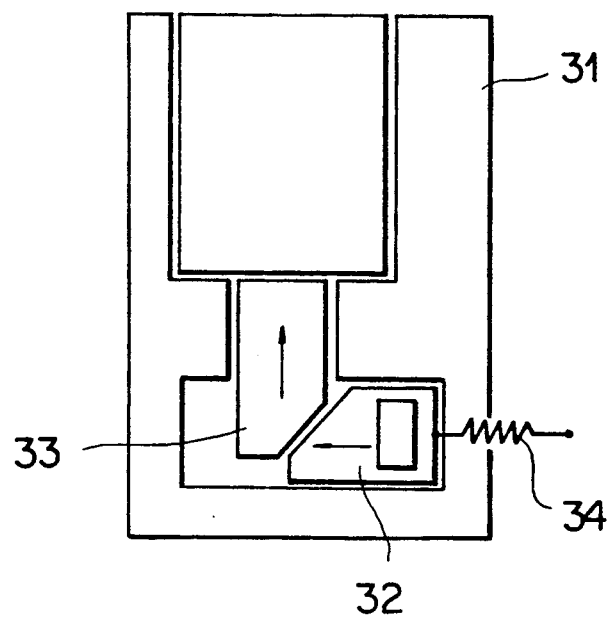

F I G. 15
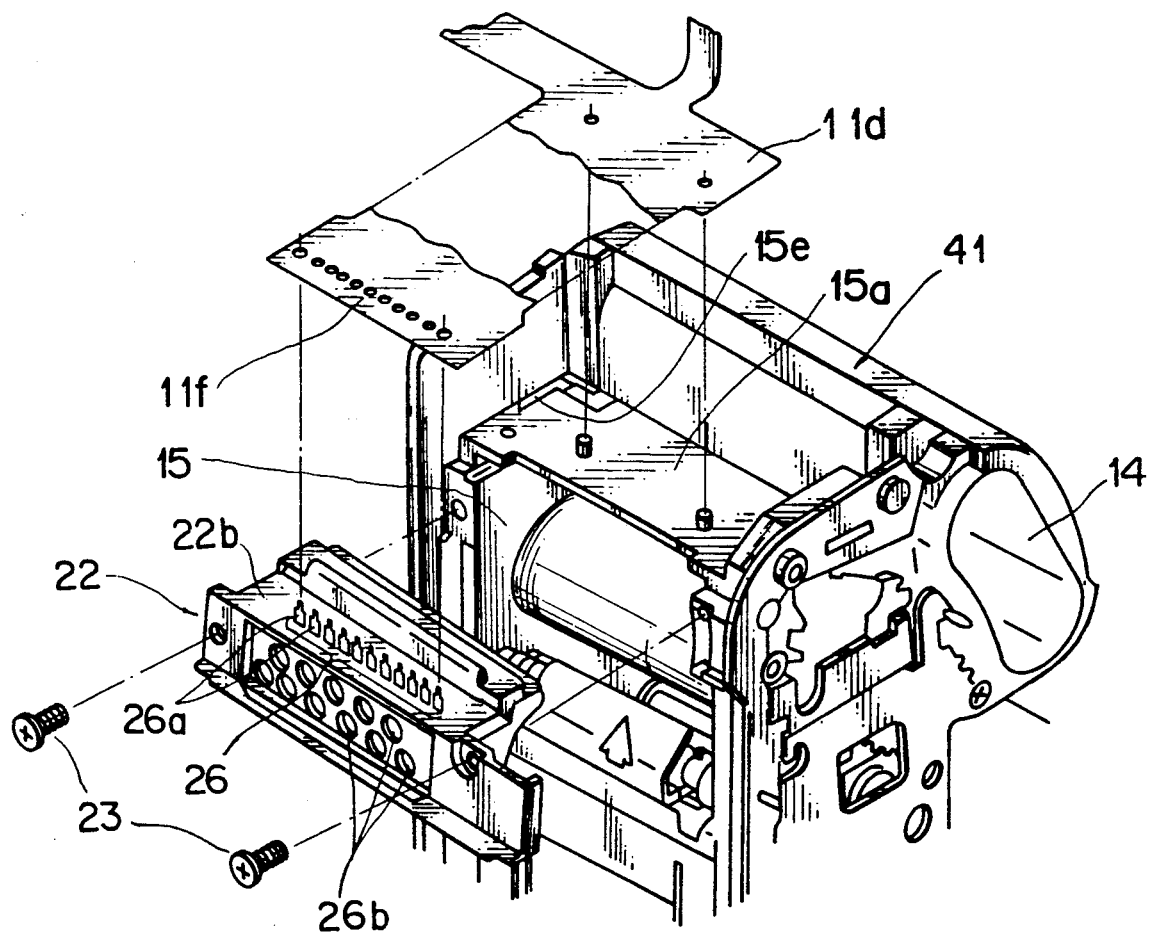

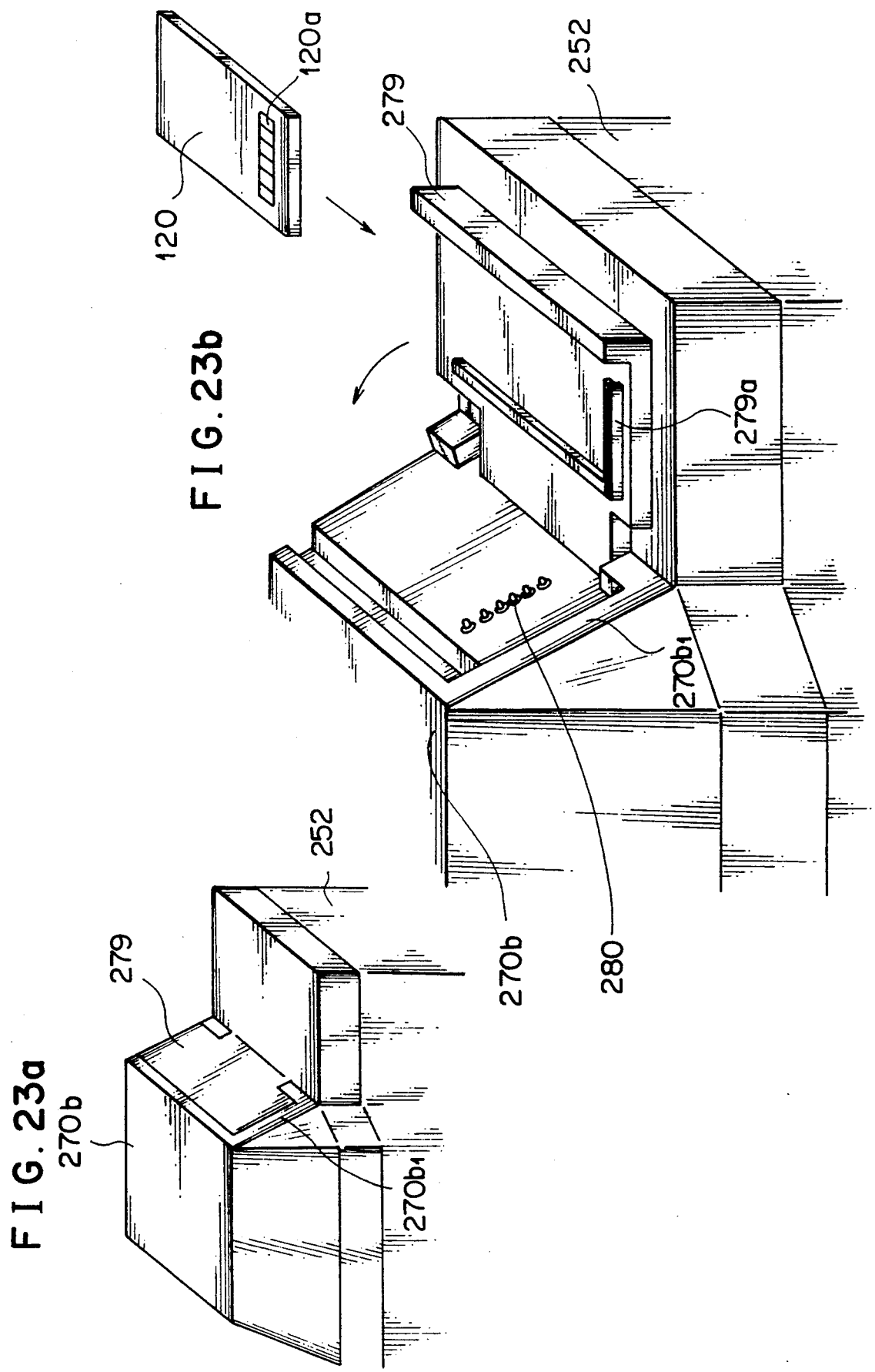

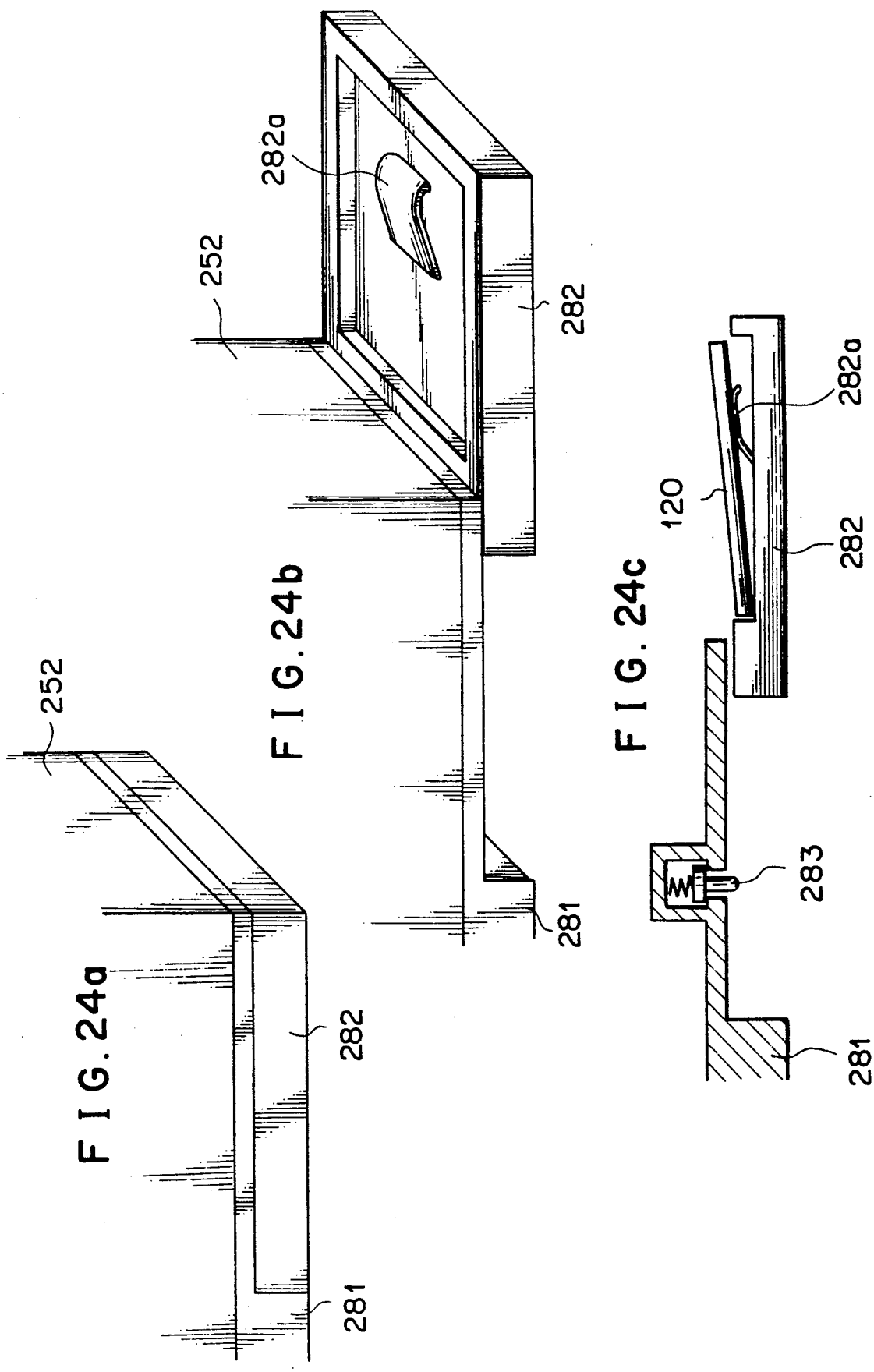

IC CARD AND CAMERA FOR USE THEREWITH

This application is a continuation of application Ser. No. 07/351,828, filed May 15, 1989 now abandoned.

BACKGROUND OF THE INVENTION

1. Field of the Invention

This invention relates to an IC (integrated circuit) card for controlling operation of a camera and also to a camera for use with such IC card.

2. Description of the Prior Art

Conventionally, a magnetic card wherein a magnetic record medium is adhered to a plastic card such as a cash card or a credit card is used as an information inputting means to an information processing system. Such magnetic card however, is disadvantageous in that it contains only a limited amount of information, and while inputting of information from the card to an information processing system is available, outputting of information from such information processing system to the card, that is, writing on the card, is not available.

In recent years, an IC card is adopted which eliminates such drawbacks of a magnetic card as described just above. Such IC card includes a microcomputer and an LSI (large scale integrated circuit) memory embedded in a plastic card. As an IC card has an IC memory of the $E^2PROM$ type or the like carried therein, it is advantageous in that it has a large storage capacity, that bi-directional transmission of information is available, and that the security is high. Accordingly. IC cards are expected to be utilized efficiently in future not only in the fields of finance and distribution but also in other various fields.

IC cards which are used commonly have a size of about 75 mm × 57 mm and a thickness of about 0.75 mm.

Meanwhile, it is already known to expand functions of a camera by communication of information between an external accessory and the camera which serves here as an information processing system.

The present invention has been made taking notice that functions of a camera such as a single lens reflex camera which has a traditional profile are controlled in various manners by means of an IC card.

SUMMARY OF THE INVENTION

It is an object of the present invention to provide an IC card which is suitably adapted to a camera as a small size device.

It is another object of the present invention to provide a camera to which an IC card for controlling functions of the camera can be mounted appropriately.

In order to attain the objects, according to the present invention, there is provided an IC card for use with a camera, the IC card being formed as a rectangular plate which has a front surface on which contents of the IC card are or can be indicated, the IC card having a plurality of connecting terminals for electric connection to the camera, the connecting terminals being disposed in a row near and along an edge of the rectangular plate on a rear surface of the rectangular plate.

According to another aspect of the present invention, there is provided a single lens reflex camera having a pentagonal roof prism accommodating section, which comprises means for removably accommodating therein an IC card, the means being located sidewardly of the pentagonal roof prism accommodating section on the top of the camera.

According to a further aspect of the present invention, there is provided a camera which comprises means for removably accommodating therein an IC card, the means being located at a side end portion of a bottom face of the camera.

According to a still further aspect of the present invention, there is provided a camera which comprises means for removably accommodating therein an IC card, the means including a receiving section formed on a rear face of the camera and an accommodating section for removably accommodating an IC card therein, the accommodating section being mounted for sliding movement on the rear face of the camera between a position at which the accommodating section is received in the receiving section and another position at which the accommodating section extends outwardly from the receiving section.

According to a yet further aspect of the present invention, there is provided a camera which comprises means for removably accommodating therein an IC card, the means including an accommodating section formed on a rear face of the camera for receiving an IC card therein and a lid member supported for pivotal motion around an axis at a side of the accommodating section between a position at which the lid member opens the accommodating section and another position at which the lid member closes the accommodating section.

According to a yet further aspect of the present invention, there is provided an IC card accommodating device having an IC card accommodating section for removably accommodating an IC card therein, which comprises a lid member for opening or closing the IC card accommodating section, the lid member having an opening formed therein, and a transparent cover member fitted in the opening of the lid member.

The above and other objects, features and advantages of the present invention will become apparent from the following description and the appended claims, taken in conjunction with the accompanying drawings.

BRIEF DESCRIPTION OF THE DRAWINGS

FIG. 11 is a perspective view of an IC card;

FIG. 12 is a schematic illustration showing a card container device of a different form;

FIG. 15 is a fragmentary perspective view illustrating another exemplary connection between the inner lid unit and the data receiving contact section of the camera body shown in FIG. 2;

FIG. 23a is a perspective view showing a further and accommodating case, and FIG. 23b is an enlarged perspective view showing the card accommodating case at a different position;

FIGS. 24a and 24b are perspective views showing a still further card accommodating case at different positions, and FIG. 24c is a side elevational view, partly in section, of the card accommodating device

DETAILED DESCRIPTION OF THE PREFERRED EMBODIMENTS

Figure 1:
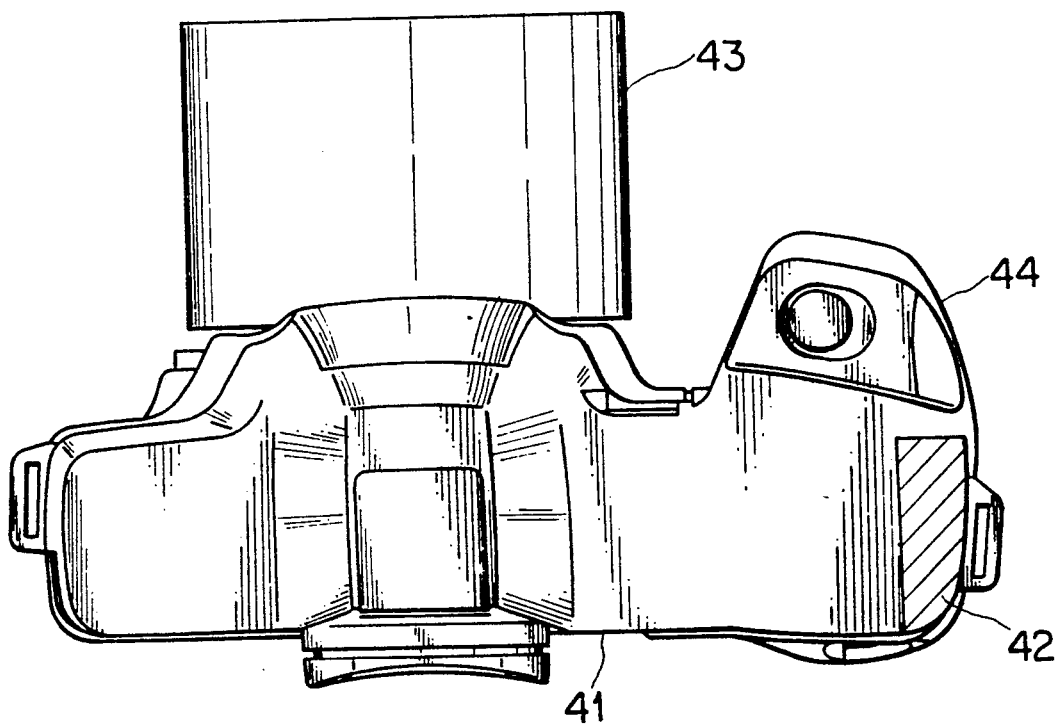
FIG. 1 is a schematic top plan of a body of a camera showing a location at which a card container device is mounted.

Referring first to FIG. 1, there is shown a body of a camera according to the present invention wherein a card container device is mounted at a location of a hatched area. The card container device generally denoted at 42 is normally accommodated in a recess formed in the camera body generally denoted at 41 at a location on the outside of a battery accommodating section and a take-up spool which are disposed in a grip section 44 at a right-hand side portion of the camera body 41. But when an IC card is to be mounted onto or removed from the card container device 42, the card container device 42 is pivoted to a position in which it is projected outwardly from the camera body 41. A lens 48 is provided on the camera body 41.

Figure 2:
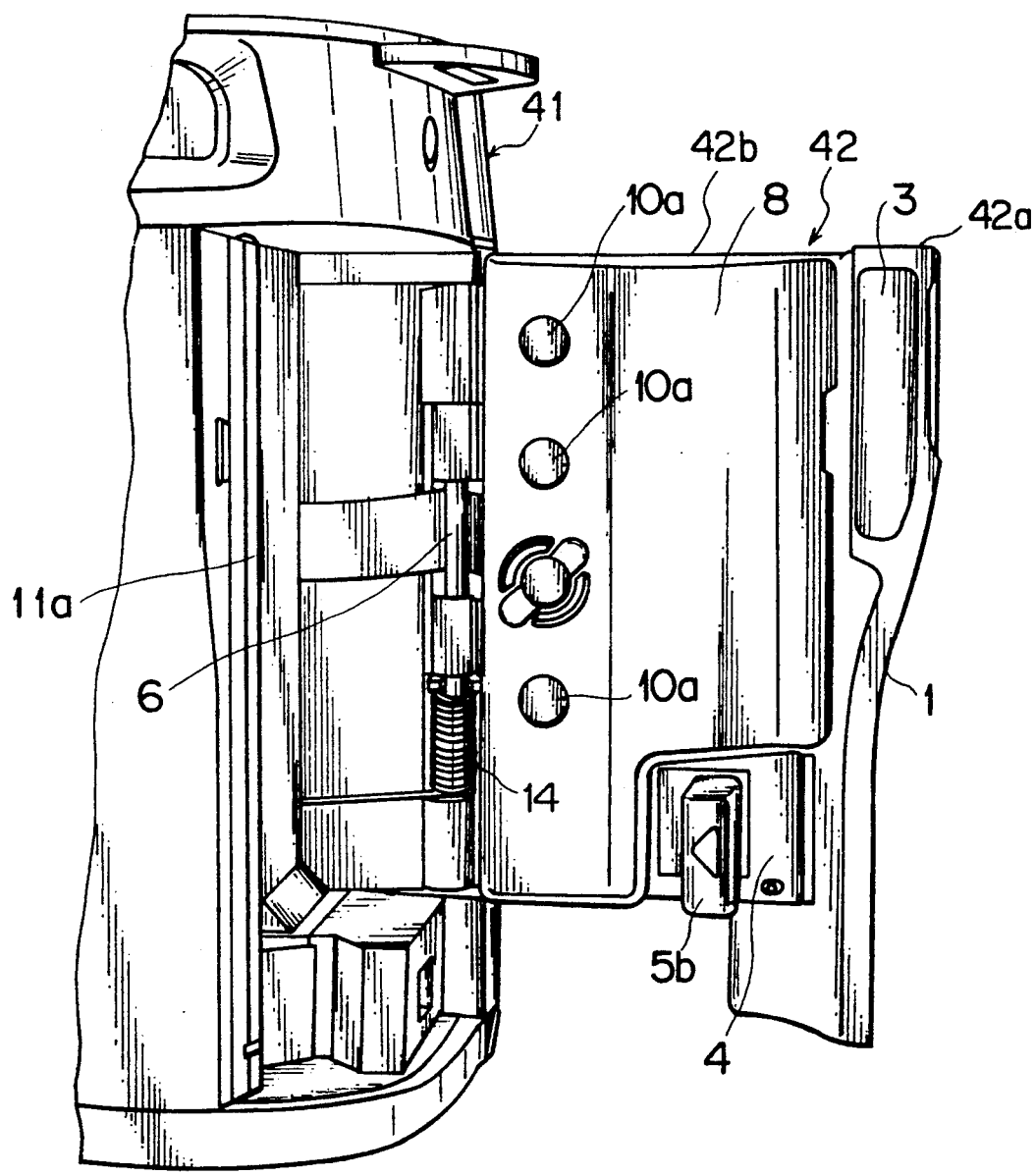
FIG. 2 is a partial side elevational view of the camera of FIG. 1 showing, in a somewhat enlarged scale, a card container device at an open position pivoted away from the camera body.
Figure 3:
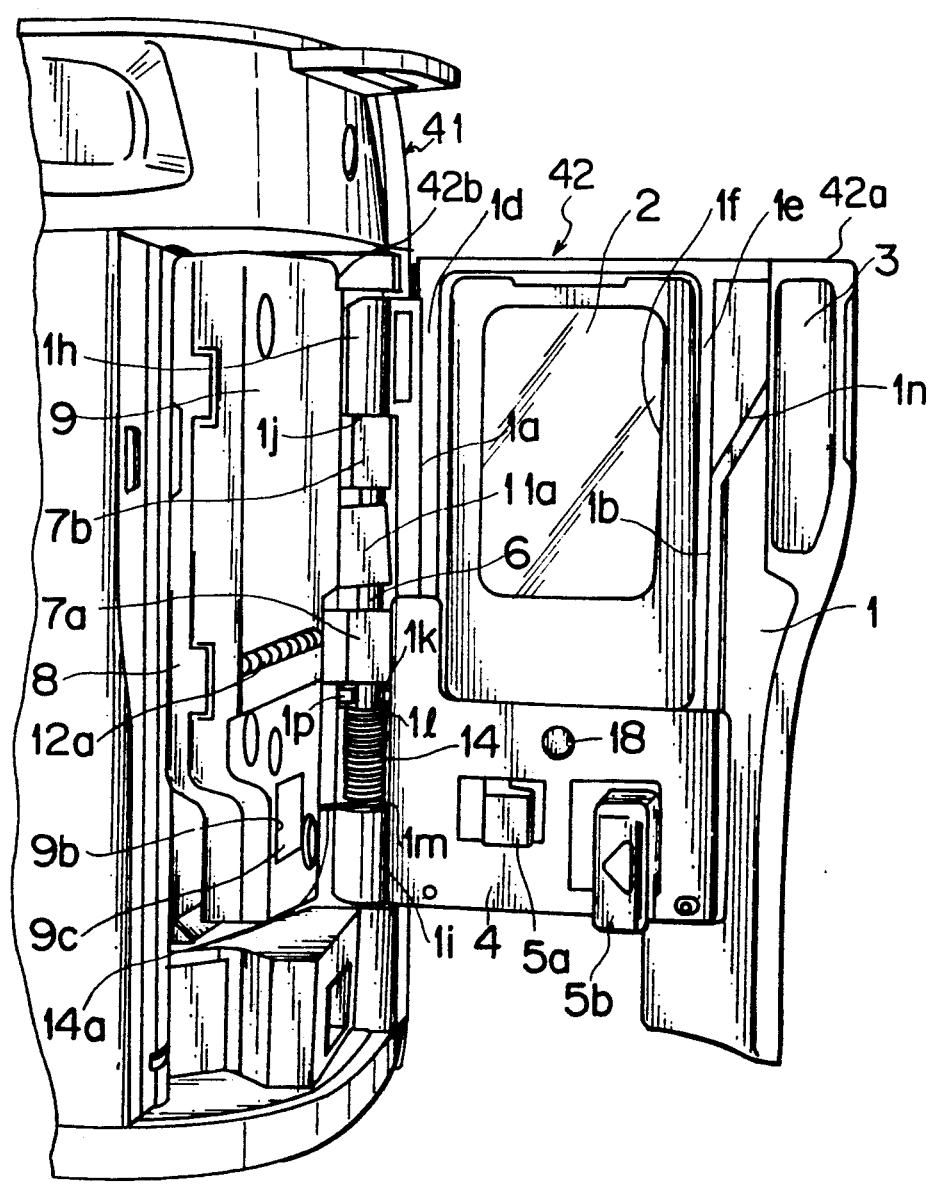
FIG. 3 is a similar view but showing an inner lid unit of the card container device of FIG. 2 at an open position pivoted to the camera body side.
Figure 4:
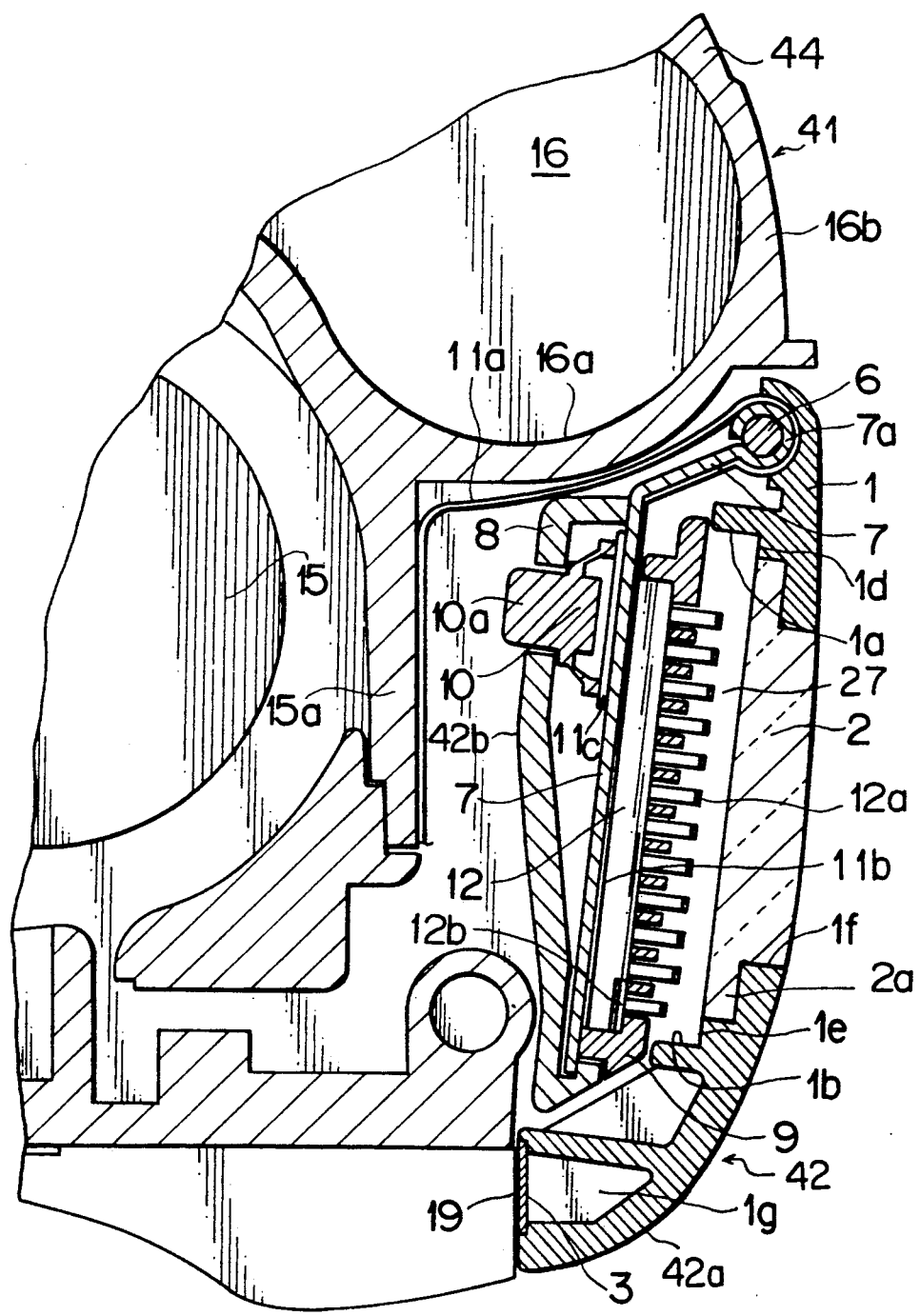
FIG. 4 is an enlarged horizontal sectional view of the card container device of FIG. 2 but in a closed position accommodated in the camera body.

Referring now to FIGS. 2 and 8, the card container device 42 is shown at such a position as described above at which it is projected outwardly from the camera body 41. Referring also to FIG. 4, the card container device 42 is composed of two principal components including a card holder unit 42a (hereinafter referred to as outer lid unit) for accommodating an IC card therein and a contact holder unit 42b (hereinafter referred to as inner lid unit) for accommodating therein contacts for connection with an IC card. In FIG. 2, the outer lid unit 42a and the inner lid 42b are shown in a mutually engaged or closed condition while FIG. 3 shows them in a mutually disengaged or opened condition. To the contrary. FIG. 4 shows the card container device 42 in an accommodated condition in the camera body 41.

The outer lid unit 42a includes an accommodating section for accommodating an IC card therein, a locking member for coupling the outer and inner lid units 42a and 42b to each other and an accommodating section for the locking member, an IC card display window, and an attracting member securing section for securing thereon an attracting member which also serves as a cover for hole portions formed for decreasing an amount of shrink after molding.

Meanwhile, the inner lid unit 42b includes, in addition to the contacts for connection with an IC card, a switch operating member, and a section for engaging with the locking member of the outer lid unit.

Figure 5:
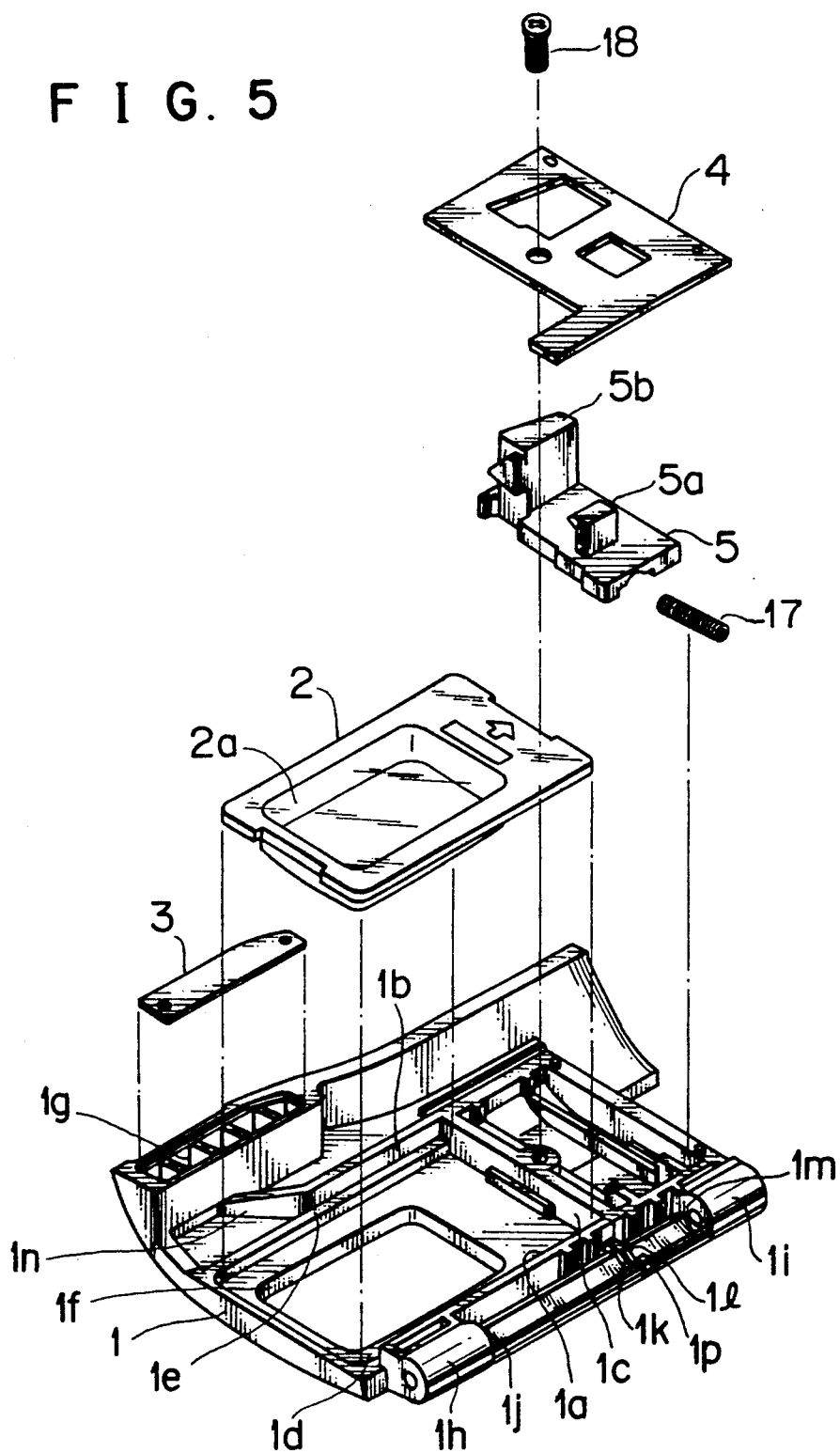
FIG. 5 is a fragmentary perspective view of an outer lid unit of the card container device of FIG. 2.

Referring also to FIG. 5, the outer lid unit 42a includes an outer lid 1 having an opening 1f formed therein in which a window portion 2a of a display window member 2 made of a transparent material such as a transparent plastic material is closely fitted to secure the display window member 2 to the outer lid 1. The outer lid 1 has formed thereon a pair of opposite side walls 1a and 1b and a bottom side wall 1c for holding an IC card therein and a pair of opposite side ribs 1d and 1e for supporting an IC card thereon. The outer lid 1 further has a tapered wall in formed on the IC card insertion side of the side wall 1b thereof for guiding an IC card to a predetermined loaded position.

The outer lid 1 has a plurality of sink mark preventing holes 1g formed at an end portion thereof, and an attracting member 3 is secured to the outer lid 1 in such a manner as to cover over the shrink mark preventing holes 1g.

A holding plate 4 is securely mounted at a lower portion of the outer lid 1 by means of a fastening screw 18, and an inner lid locking member 5 is interposed between the holding plate 4 and the outer lid 1 and is normally urged by a spring 17 in a direction to engage an arresting projection 5a thereof with an engaging face 9b of a contact cover member 9 which will be hereinafter described. The inner lid locking member 5 has an operating portion 5b for manual operation thereof to move the same relative to the outer lid 1. Here, the inner lid locking member 5 is made of a conducting material. A gap or part of a card chamber 27 is formed between the holding plate 4 and the ribs 1d and 1e of the outer lid 1 such that a leading end portion of an IC card may be inserted into the gap. When an IC card is thus inserted to or removed from the loaded position, it s guided in forward and backward directions by the holding plate 4 and the ribs 1d and 1e of the outer lid 1.

The outer lid 1 has a pair of bearing portions 1h and 1i formed at the opposite upper and lower end portions thereof as shown in FIGS. 3 and 5. A hinge shaft 6 is received in the bearing portions 1h and 1i of the outer lid 1 and thus provides an axis around which the outer lid unit 42a and the inner lid unit 42b are pivoted relative to each other as seen in FIG. 4.

Figure 6:
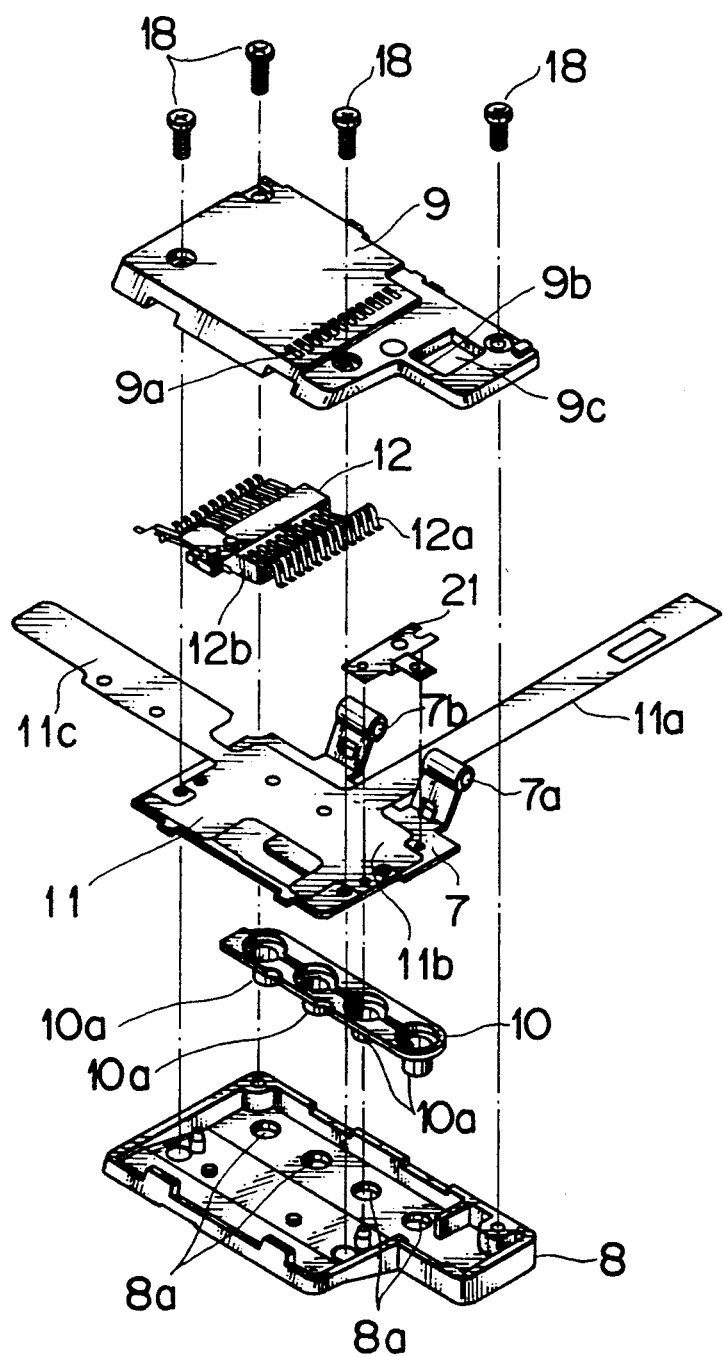
FIG. 6 is a fragmentary perspective view of the inner lid unit shown in FIG. 2.

Referring now to FIG. 6, the inner lid unit 42b includes a switch cover member 8 and a contact cover member 9 secured to the switch cover member 8 by means of a plurality of fastening screws 18. A switch member 10 made of a conducting rubber material and serving as a switch operating member, an inner lid base plate 7 to which a flexible circuit board 11 is secured, and a card contact member 12 are interposed between the switch cover member 8 and the contact cover member 9.

Referring also to FIGS. 3 and 5, the inner lid base plate 7 has a pair of bearing portions 7a and 7b provided thereon for receiving the hinge shaft 6 therein to support the inner lid unit 42b for pivotal motion around the hinge shaft 6. The bearing portions 7a and 7b of the inner lid base plate 7 are located between an end face 1j of the bearing portion 1h and an opposing end face 1k of a protrusion 1p of the outer lid 1 on which the hinge shaft 8 is located, and a coil spring 14 is disposed around an outer periphery of the hinge shaft 6 between an end face 1m of the other bearing portion 1i and the other opposing end face 1l of the protruded portion 1p of the outer lid 1 to urge the inner lid unit in its closing direction.

The flexible circuit board 11 secured to the inner lid base plate 7 includes three flexible wiring portions 11a, 11b and 11c for coupling electric signals from the inner lid unit 42b to the camera body 41. The flexible wiring portions 11b and 11c of the flexible circuit board 11 are secured to the front and rear faces of the inner lid base plate 7 so that it is disposed in a folded condition on the inner lid base plate 7 although, in FIG. 6, the flexible wiring portion 11c is not shown secured to the inner lid base plate 7 but shown extending in the same plane with the flexible wiring portion 11b.

Referring to FIGS. 4 and 8, the conducting rubber switch member 10 is held between the inner lid base plate 7 and the switch cover member 8. The conducting rubber switch member 10 has a plurality of switch portions 10a formed thereon which extend through and outwardly from corresponding perforations 8a formed in the switch cover member 8 so that electric signals may be transmitted between the conducting rubber switch member 10 and the flexible wiring portion 11c of the flexible circuit board 11 located on the inner lid base plate 7. The switch portions 10a formed on the conducting rubber switch member 10 are preferably such switches which are not used frequently or which should not be touched inadvertently like a switch for inputting film sensitivity information by manual operation, a switch for rewinding a film before the entire film is used up, or a switch for adjusting the time of a self timer.

The card contact member 12 is held between the contact cover member 9 and the inner lid base plate 7 and located in position by a positioning means not shown formed on the contact cover member 9. The card contact member 12 has a plurality of contacts 12a formed thereon by insert molding. As also seen in FIG. 3, one ends of the card contacts 12a of the card contact member 12 are projected outwardly through a plurality of windows 9a formed in the contact cover member 9 so that they may be contacted with contact portions of an IC card loaded in position on the outer lid 1 of the outer lid unit 42a. Thus, as seen rom FIG. 4, the electrical contacts are spaced on the opposite side of the card chamber or IC card accommodating section 27 from the transparent cover member 2. The other ends of the card contacts 12a are opposed to the inner lid base plate 7 and connected to the flexible wiring portion 11b of the flexible circuit board 11 mounted on the inner lid base plate 7 so that electric signals may be transmitted between the card contacts 12a of the card contact member 12 and the flexible circuit board 11.

The card contact member 12 has a card detecting contact 12b provided thereon for detecting an IC card loaded in position. The card detecting contact 12b is mounted at a location spaced from the axis of the hinge shaft 6, that is, at a left end location of the card contact member 12 in FIG. 6 and is disposed such that one end thereof may be contacted with at least one of the card contacts 12a of the card contact member 12 while the other end thereof is held in contact with a contact of the flexible wiring plate 11b of the flexible circuit board 11.

Referring to FIG. 6, a ground contact member 21 is mounted on the inner lid base plate 7 and connected at an end thereof to the flexible circuit board 11. The ground contact member 21 is disposed in contact with the engaging face 9b formed on the contact cover member 9.

In particular, the contact cover member 9 has an opening 9c formed at a location thereof corresponding to the arresting portion 5a of the inner lid locking member 5, and the engaging face 9b is defined by one side or end face of the opening 9c of the contact cover member 9. The outer lid unit 42a and the inner lid unit 42b are coupled for integral operation to each other when the engaging portion 5a of the inner lid locking member 5 is held in engagement with the engaging face 9b of the contact cover member 9 as particularly shown in FIG. 7. However, if the operating portion 5b of the inner lid locking member 5 is manually operated to move the inner lid locking member 5 against the urging force of the spring 17, then the inner lid unit 42b is released from the outer lid unit 42a.

Referring back to FIG. 4, the hinge shaft 8 is supported on the camera body 41 at an end portion of a side wall 16b of the grip section 44 which is formed in a projecting manner on the camera body 41 so that it may be gripped by fingers of the right hand of an operator and has a battery accommodating chamber 16 formed therein.

The camera body 41 has a dead space on the right-hand side of a take-up film chamber 15 between the battery accommodating chamber 16 and the rear lid side of the camera body 41, and an outer wall section is disposed in the dead space and extends between the side wall 16b of the battery accommodating chamber 16 and the rear lid side of the camera body 41. The outer wall section is provided by the outer lid 1 which is supported at one end thereof by the hinge shaft 6 and has the attracting member 8 located at the other end thereof for contacting with a magnet 19 provided on the camera body 41.

Referring to FIG. 3 the hinge shaft 8 extends through the bearing portions 1h and 1i formed on the outer lid 1 of the outer lid unit 42a and the bearing portions 7a and 7b formed on the inner lid base plate 7 of the inner lid unit 42b. The hinge shaft 6 further extends through the coil spring 14 which is anchored at an end thereof, though not particularly shown, to the camera body 41 and at the other end thereof to the contact cover member 9 of the inner lid unit 42b to urge the contact cover member 9 to move into the inside of the camera body 41. With the construction described just above, the inner lid unit 42b is normally acted upon by a force to urge the same in a closing direction to move into the camera body 41 by the coil spring 14, and accordingly, the outer lid unit 42a which normally engages with the inner lid unit 42b is normally held at its closing position as shown in FIG. 4 to prevent damage thereto by an inadvertent catch.

As described above, the inner lid locking member 5 provided on the outer lid unit 42a for engaging the inner lid unit 42b and the outer lid unit 42a with each other is formed from a conducting material. Accordingly, when the outer lid unit 42a and the inner lid unit 42b are engaged in an integral relationship with each other, the inner lid locking member 5 is connected and thus grounded to the flexible circuit board 11 by way of the ground contact 21 so that static electricity which may otherwise be accumulated therein may be discharged therefrom.

When the card accommodating device having such a construction as described above is in a normal condition, the outer lid unit 42a and the inner lid unit 42b are held in an integrated relationship with each other by means of the locking means wherein the arresting portion 5a of the inner lid locking member 5 and the engaging face 9b of the contact cover member 9 are engaged with each other. The card container device is held, in the space located sidewardly of the take-up side spool chamber 15 of the camera body 41 behind the battery accommodating chamber 16, at the closing position shown in FIG. 4 at which an outer face of the outer lid 1 thereof serves as an outer wall of the camera body 41, in the position, the attracting member 3 located at the end portion of the outer lid 1 remote from the hinge shaft 6 contacts with the magnet 19 mounted on the camera body 41 so that the magnetic attracting force between the attracting member 3 and the magnet 19 may act to hold the outer lid unit 42a with certainty on the camera body 41 and thus prevent the outer lid unit 42a from being opened inadvertently from the camera body 41.

In this condition, if the outer lid 1 is manually operated to move in the opening direction against the magnetic attracting force between the attracting member 3 and the magnet 19 and the urging force of the coil spring 14, then the outer lid unit 42a and the inner lid unit 42b may be pivoted in an integral relationship to such an open position as seen in FIG. 2. Consequently a wall face of the switch cover member 8 which constitutes an inner wall of the inner lid unit 42b is exposed outside to allow manual operation of the switch portions 10a of the conducting rubber switch member 10 which are projected outwardly from the switch cover member 8.

An abutting face may be formed on the outer lid 1 of the outer lid unit 42a for contacting, when the outer lid 1 is pivoted in the opening direction toward the camera body 41, with the camera body 41 to define a pivoted position of the outer lid 1. The outer lid unit 42a and the inner lid unit 42b can thus be integrally pivoted to the predetermined pivoted position, and since the direction of manually depressing operation of any of the switch portions 10a of the conducting rubber switch member 10 coincides with the opening direction of the outer lid unit 42a and the inner lid unit 42b, the outer lid unit 42a and the inner lid unit 42b can be held at the open position during manually depressing operation of any of the switch portions 10a of the conducting rubber switch member 10.

Figure 7:
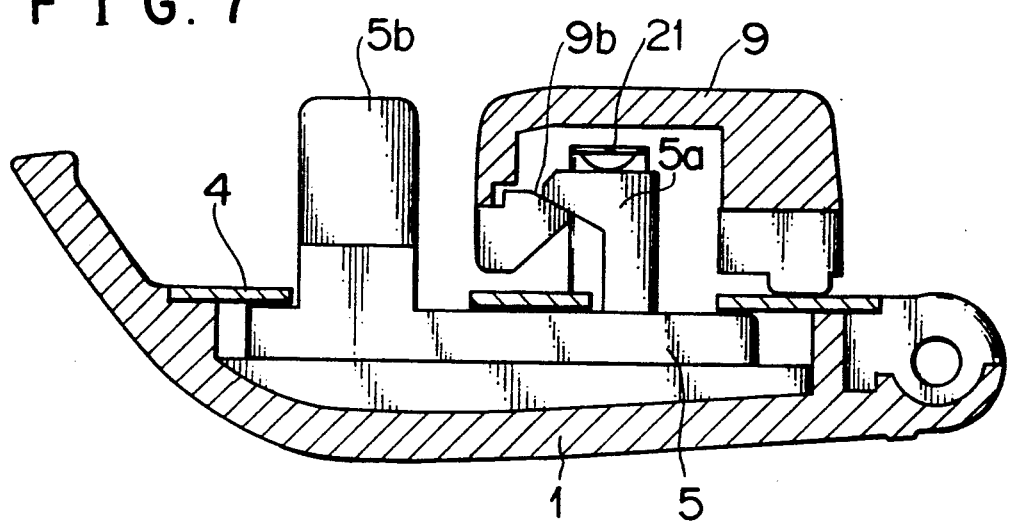
FIG. 7 is an enlarged horizontal sectional view showing an engaging relationship between the outer and inner lid units of FIGS. 5 and 6 with each other.

In order to cancel the engagement between the outer lid unit 42a and the inner lid unit 42b and load an IC card in position into the outer lid unit 42a, at first the operating portion 5b of the inner lid locking member 5 shown in FIG. 7 is manually operated to move in the rightward direction in FIG. 7 against the spring 17 shown in FIG. 5. Thereupon, the arresting portion 5a of the inner lid locking member 5 is disengaged from the engaging face 9b of the contact cover member 9 to disengage the inner lid unit 42b from the outer lid unit 42a. As a result, the inner lid unit 42b is pivoted toward the camera body 41 by the urging force of the coil spring 14 until it is contacted with and stopped by the abutting face of the camera body 41. In this instance, the outer lid unit 42a is acted upon by no urging force and thus stopped at a position determined by its own weight as seen in FIG. 3. Because the camera body 41 is normally carried with the lens barrel directed downwardly for convenience of operation during camera operations other than photographing operation, the outer lid unit 42a is held in its open condition by its own weight.

When the inner lid unit 42b is in a disengaged condition from the outer lid unit 42a, a surface of the contact cover member 9 of the inner lid unit 42b as seen in FIG. 3 is exposed outside, and consequently, an operator may inadvertently touch with the contacts 12a of the card contact member 12 located on the surface of the contact cover member 9 to damage an IC and so on due to static electricity of the operator. In this connection, in the card container device described above, since the inner lid locking member 5 is formed from a conducting material and grounded to the flexible circuit board 11 by way of the ground contact 15, a possible influence of such static electricity is eliminated at a point of time when the inner lid locking member 5 is manually operated because the static electricity of the operator is discharged through the locking member 5.

An IC card is loaded in position into the outer lid unit 42a while the outer lid unit 42a and the inner lid unit 42b are in a disengaged condition from each other.

In order to load an IC card in position, it is slidably moved from above along a tapered portion in formed on the outer lid 1 of the outer lid unit 42a. In this instance the IC card is moved under the guidance of the opposite side walls 1a and 1b of the outer lid 1 until it is contacted with and stopped at a loaded position by the bottom wall 1c of the outer lid 1. At the loaded position of the IC card, it is placed on the opposite side ribs 1d and 1e of the outer lid 1 and the leading end portion thereof is restricted from movement in a direction of the thickness thereof by the holding plate 4.

Referring to FIG. 11, such an IC card as described above is shown. The IC card generally denoted at 20 has a plurality of lead contacts 20a provided at locations thereof corresponding to the contacts 12a projected through the windows 9a of the contact cover member 9 of the inner lid unit 42b. The IC card 20 has information of a type of the card and so on indicated by printing or the like on the opposite surface 20b thereof to the surface on which the contacts 20a are provided. When the IC card 20 is loaded in position into the outer lid unit 42a, the information indicated on the IC card 20 is adjacent the transparent display window member 2, and thus can be confirmed from outside the camera body 41 through the transparent display window member 2 securely mounted on the outer lid 1.

When the outer lid unit 42a on which the IC card 20 is loaded in position is pivoted so as to be engaged with the inner lid unit 42b positioned inside the camera body 41, the contacts 20a of the IC card 20 are contacted one after another with the contacts 12a projected outwardly from the windows 9a of the contact cover member 9 of the inner lid unit 42b beginning with one of the contacts 20a which is located nearest to the center of the hinge shaft 6. Through such contacting condition between the contacts 20a of the IC card 20 and the contacts 12a of the card contact member 12, the IC card 20 is electrically connected to the camera body side by way of the flexible circuit board 11.

Figure 8A:
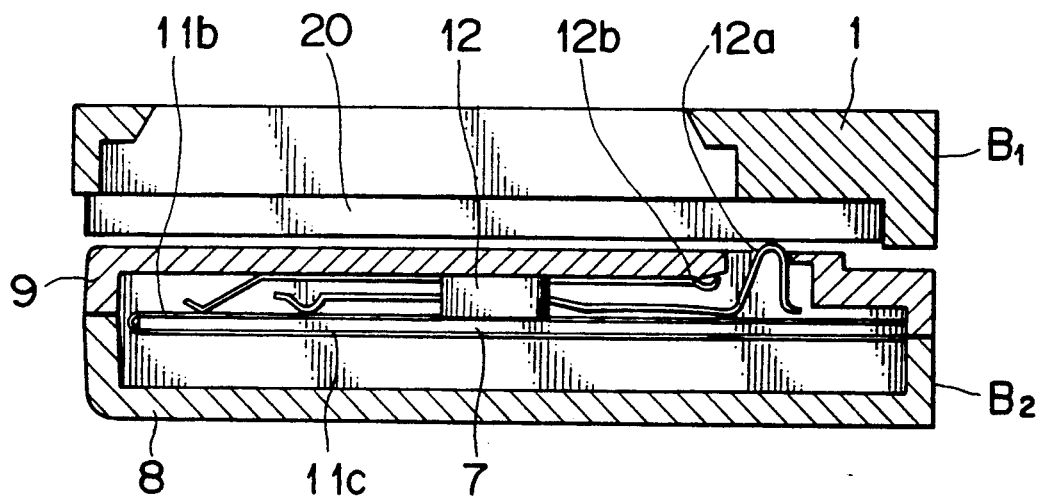
FIGS. 8a and 8b are sectional views showing an IC card detecting means at different positions.
Figure 8B:
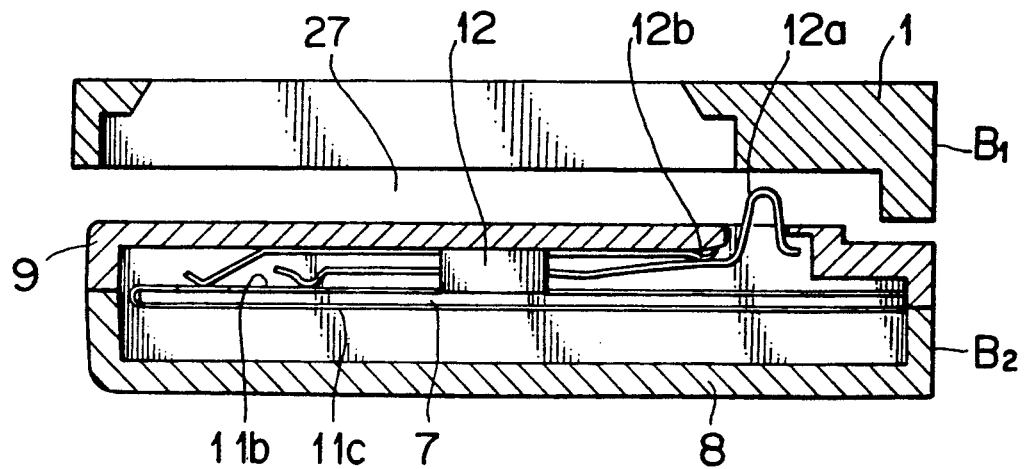

FIGS. 8a and 8b illustrate a relationship between one of the card contacts 12a and the card detecting contact 12b of the card contact member 12. When no IC card is loaded in position in the outer lid unit 42a as seen in FIG. 8b, even if the outer lid unit 42a and the inner lid unit 42b are engaged with each other, the card contact 12a remains at its upper position in which it contacts with the card detecting contact 12b to present an on-state. which represents that no IC card is loaded in position.

If an IC card 20 is loaded in position into the outer lid unit 42a, then the card contact 12a is pushed down by the IC card 20 as seen in FIG. 8a. As a result, the card contact 12a is brought out of contact with the card detecting contact 12b to now present an off-state, which represents that an IC card is loaded in position.

In this manner, whether or not an IC card is loaded in position can be detected by an on- or off-state of the card detecting contact 12b and the card contacts 12a which are operated by an IC card 20 and can be known to an operator from information indicated on the face 20b of the IC card 20 which can be read through the display window section 2 of the outer lid 1 by the operator.

In case an IC card 20 is loaded but not correctly in the predetermined position, for example, if an IC card 20 is loaded with its front face directed rearwardly, also an off-state signal will be derived from the card detecting contact 12b. However, since the contacts 20a of such IC card 20 will not be contacted with the card contacts 12a and remain in an off-state and information will not be transmitted from the IC card 20 to the camera body side, a loaded condition in error of the IC card 20 can be detected. Such detection signal can be applied to give a warning to the operator.

Figure 9:
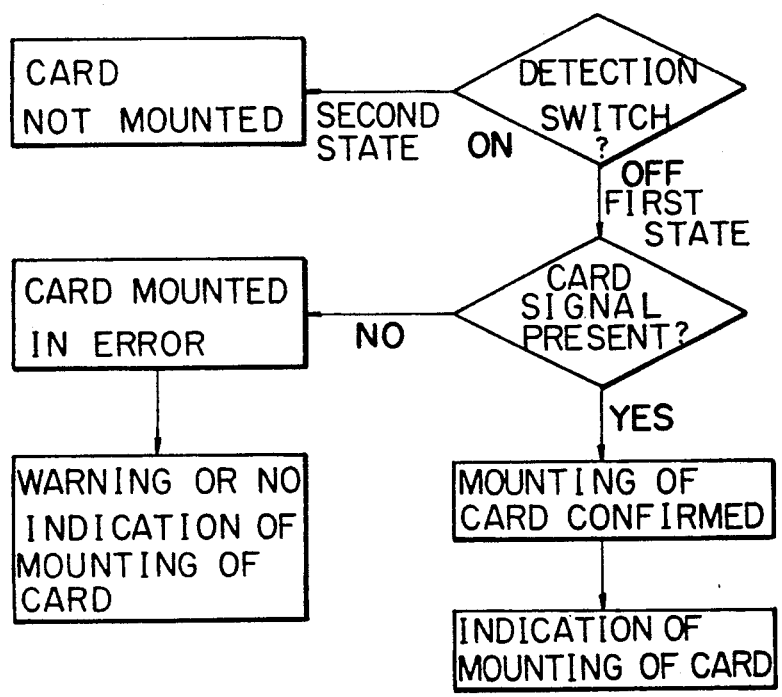
FIG. 9 is a flow chart illustrating operation of the card container device to be executed in response to the IC card detecting means of FIGS. 8a and 8b.
Figure 10:
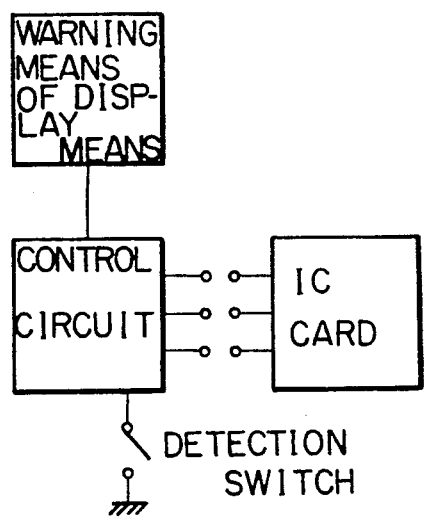
FIG. 10 is a block diagram showing an IC card detecting circuit.

Such application of a detection signal is attained, for example, by such a device as shown in a schematic diagram of FIG. 10. In this instance, a control circuit of the device shown in FIG. 10 may operate in accordance with such a flow chart as, for example, illustrated in FIG. 9. The control circuit thus judges from a current state of a detection switch of the device shown in FIG. 10 whether an IC card is loaded in the card container device (first condition) or not (second condition), and judges, in case an IC card is loaded, whether or not the IC card is loaded correctly in the card container device. Results of such judgment are transmitted to a warning means or a display means of the device shown in FIG. 10 so that a warning may be provided by the warning means or such results may be indicated on the display means.

After it is confirmed that an IC card has been loaded in position into the outer lid unit 42a, the outer lid unit 42a and the inner lid unit 42b which are coupled in an integral relationship to each other with the engaging face 9b of the contact cover member 9 engaged with the arresting portion 5b of the inner lid locking member 5 of the locking means are further pivoted toward the inside of the camera body 41 until the attracting member 8 provided on the outer lid 1 is contacted with the magnet 19 on the camera body 41 to bring the loaded IC card 20 into a condition for use.

While the card container device described above consists principally of the two components including the outer lid unit 42a and the inner lid unit 42b, it may otherwise be constituted from a single principal component.

Referring now to FIG. 12, there is shown an example of mechanism for inserting and removing an IC card wherein an ejecting mechanism is provided to push out an IC card to an ejected position when the IC card is to be removed from a card insertion opening formed in an upper wall or a side wall of a card container device. In particular, the ejecting mechanism is provided at a location remote from an insertion opening of an IC card accommodating chamber which is defined by a base member 31. The ejecting mechanism includes a pushing out member 33 for pushing out an IC card, an operating member 32 manually operable for moving the pushing out member 33 in an upward direction, and an operating member returning spring 34 for normally urging the operating member 32 to hold an IC card at its loaded position. An IC card is thus inserted into the base member 31 through the insertion opening and thereafter held at its loaded position, and when it is to be removed, the operating member 32 is manually operated to move in the leftward direction against the urging force of the operating member returning spring 34 so that the pushing put member 33 is moved upwardly by the operating member 32 to allow removal of the IC card.

The card container device which includes such base member 31 as described above is supported for pivotal motion at a side wall portion of a camera. When an IC card is to be loaded or exchanged, the card insertion opening of the base member 31 is projected outwardly from the camera side wall portion. The card insertion opening of the card container device in which an IC card is loaded in position is positioned inside the camera body and a side wall of the camera container device serves as a side wall portion of the camera similarly as in the card container device shown in FIGS. 1 to 11.

Figure 13:
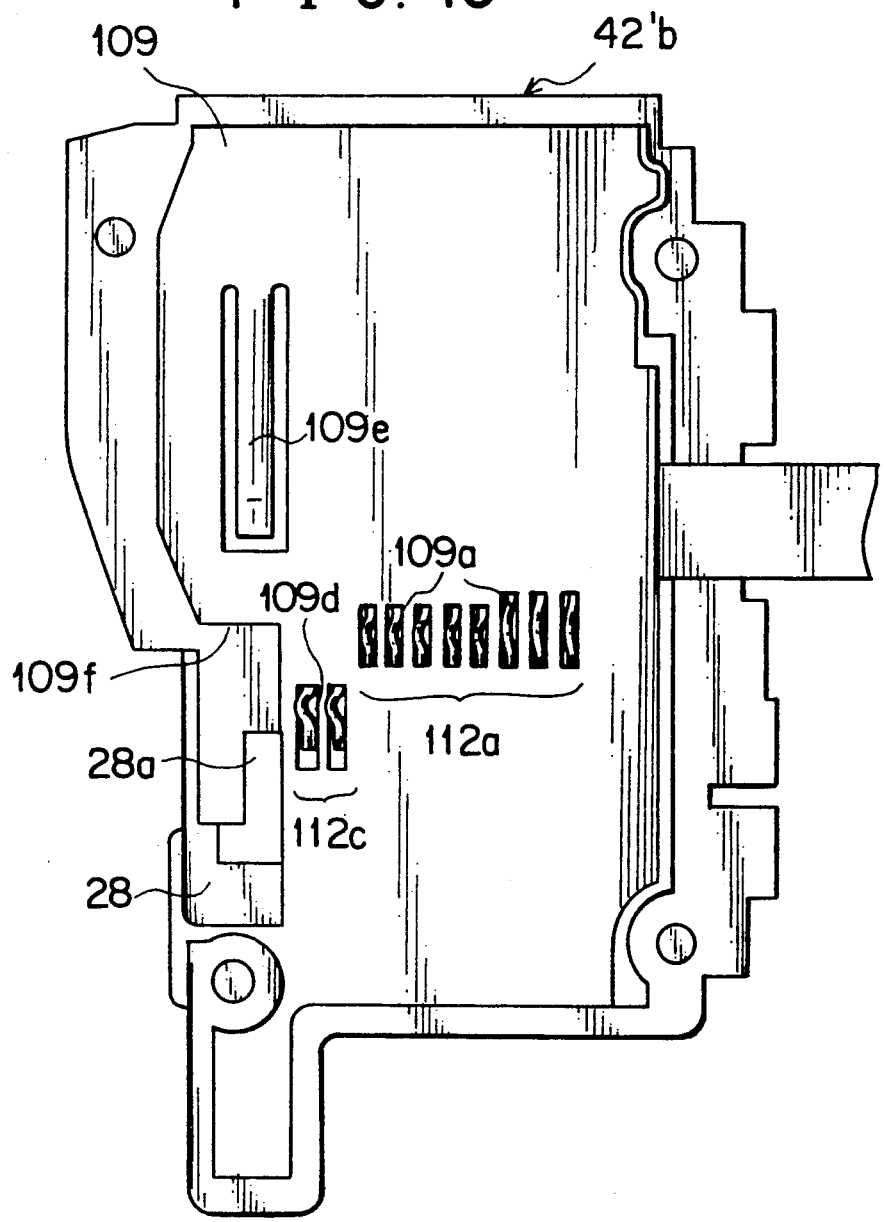
FIG. 13 is a schematic view showing an inner lid unit of a modified card container device.

Referring to FIG. 13, there is shown a modification to the inner lid unit 42b of the card container device shown in FIGS. 1 to 11 The modified inner lid unit is denoted at 42'b and includes a contact cover member 109 having a plurality of windows 109a and another pair of windows 109d perforated therein. A plurality of contacts 112a of a card contact member not shown in FIG. 13 extend through the windows 109a of the contact cover member 109 while a pair of contacts 112c of the card contact member extend through the windows 109d of the contact cover member 109 for contacting with an IC card loaded in position to detect presence of such IC card. The contacts 112c thus act similarly as the card detecting contact 12b in the card container device described hereinabove which cooperates with one of the card contacts 12a to detect presence of an IC card load in position.

The card contact member 109 further has an elongated friction finger 109e formed thereon. The friction finger 109e is bent at an end portion thereof at an obtuse angle and disposed for frictional engagement with an IC card when the IC card is inserted in position. When the IC card is in position, the friction finger 109e frictionally contacts with the IC card to prevent inadvertent jumping out of the IC card from the card container device.

Figure 14:
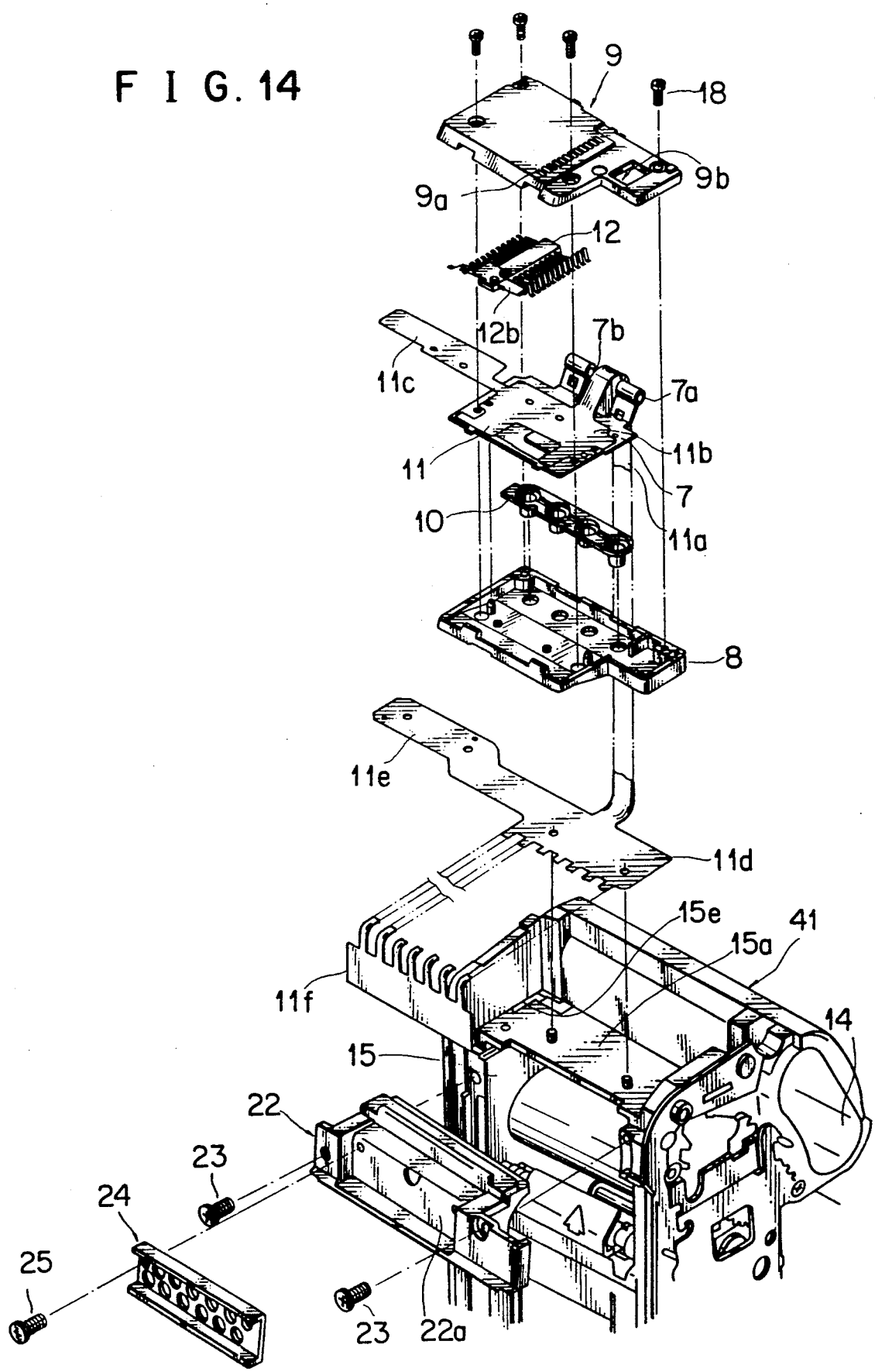
FIG. 14 is a fragmentary perspective view illustrating an exemplary connection between the inner lid unit and a data receiving contact section of the camera body shown in FIG. 2.

Referring now to FIG. 14, there is shown an exemplary connection of the flexible wiring portion 11a of the flexible circuit board 11 particularly shown in FIGS. 3 and 6 to a data receiving section disposed in the take-up spool chamber 15 of the camera body 41.

The data receiving section includes a data receiving contact holder 22 located behind the take-up spool chamber 15 i.e., the rear lid side of the camera body 41 and securely mounted on the camera body 41 by means of a pair of fastening screws 23. The data receiving contact holder 22 has a wide recess formed therein, and a data receiving contact cover 24 is fitted in the wide recess and secured to the data receiving contact holder 22 by means of a pair of fastening screws 25 (only one is shown in FIG. 14).

The flexible wiring portion 11a of the flexible circuit board 11 provided in the inner lid unit 42b extends around the hinge shaft 6 (not shown in FIG. 14 but shown in FIG. 4) and has a connecting portion lid formed at an end thereof remote from the flexible wiring portion 11b. The connecting portion lid of the flexible circuit board 11 is adhered, by means of a double-sided adhesive tape not shown, to a side wall 15a of the take-up spool chamber 15 of the camera body 41. In order to connect the flexible circuit board 11 to an upper portion of the camera body 41 and data receiving contacts not shown, the connecting portion lid of the flexible circuit board 11 has provided thereon a connecting pattern portion 11e which is to be connected to a main flexible circuit board not shown located at an upper portion of the camera body 41 and another connecting pattern portion 11f which is to be connected to the data receiving contacts on the camera body 41.

The connecting pattern portion 11e of the flexible circuit board 11 extends upwardly through a slit 15e formed at an upper portion of the side wall 15a of the take-up spool chamber 15 to an upper portion of the camera body 41. To the contrary, the other connecting pattern portion 11f extends rearwardly along the side wall 15a of the take-up spool chamber 15 and around the rear end of the side wall 15a and is disposed on a data receiving contact cover mounting face 22a provided by the bottom of the wide recess formed in the data receiving contact holder 22. The data receiving contact cover 24 on which data receiving terminals not shown are located is placed on the connecting pattern portion 11f of the flexible circuit board 11 mounted on the mounting face 22a of the data receiving contact holder 22 and is thus secured to the data receiving contact holder 22 together with the connecting pattern portion 11f of the flexible circuit board 11 by means of the screws 25.

Referring now to FIG. 15 there is shown a modification to the connection between the connecting pattern portion 11d of the flexible circuit board 11 and the data receiving terminals shown in FIG. 14. In particular, the data receiving contact cover 24 and the data receiving contact holder 22 shown in FIG. 14 are formed as a unitary data receiving contact holder 22. In this instance, a plurality of metal plates 26 which form data receiving contact portions 26b are mounted in the data receiving contact holder 22 by insert molding, and the connecting pattern portion 11f of the flexible circuit board 11 is connected by soldering to connecting projections 26a of the metal plates 26, projected from a side wall 22b of the data receiving contact holder 22. The data receiving contact holder 22 is secured to upper and lower end walls of the take-up spool chamber 15 by means of a pair of fastening screws 23.

Figure 16:
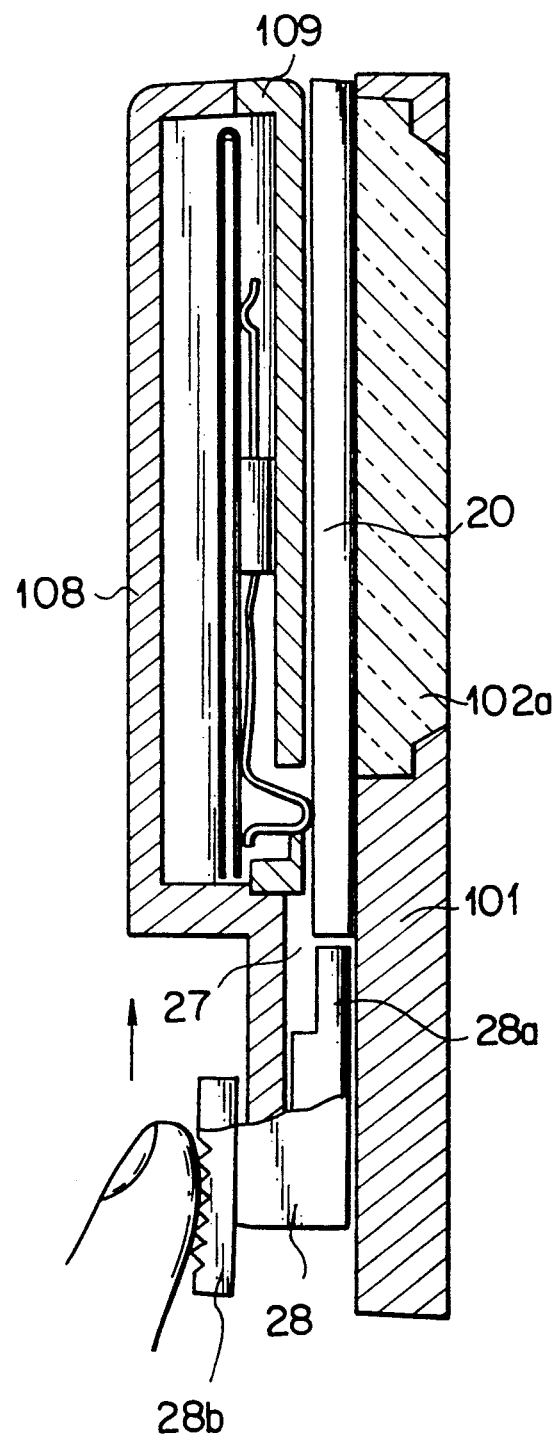
FIG. 16 is a sectional view showing a card container device having a card ejecting mechanism.
Figure 17:
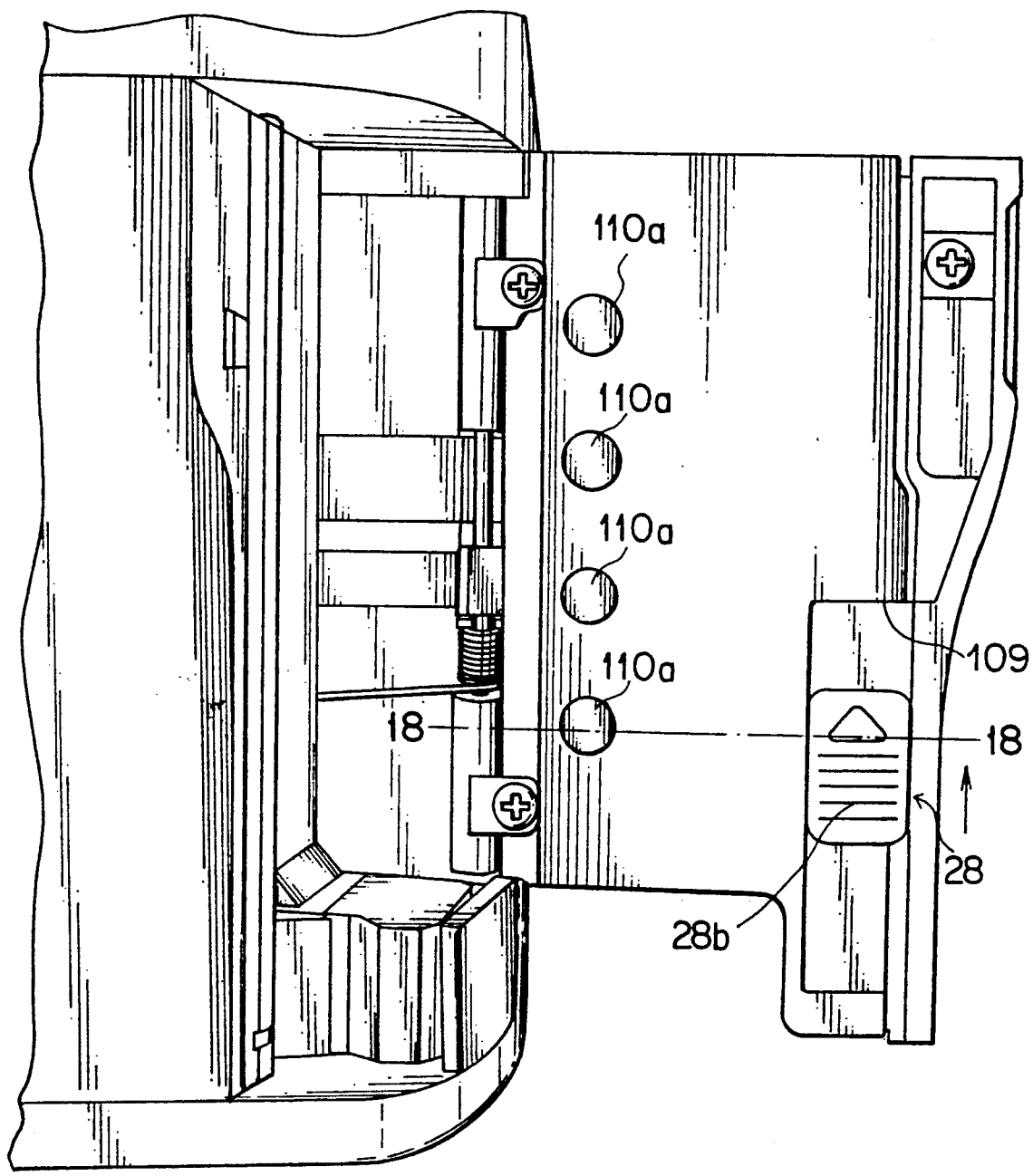
FIG. 17 is a rear elevational view showing the card container device of FIG. 16 at an open position pivoted away from a camera body.
Figure 18:
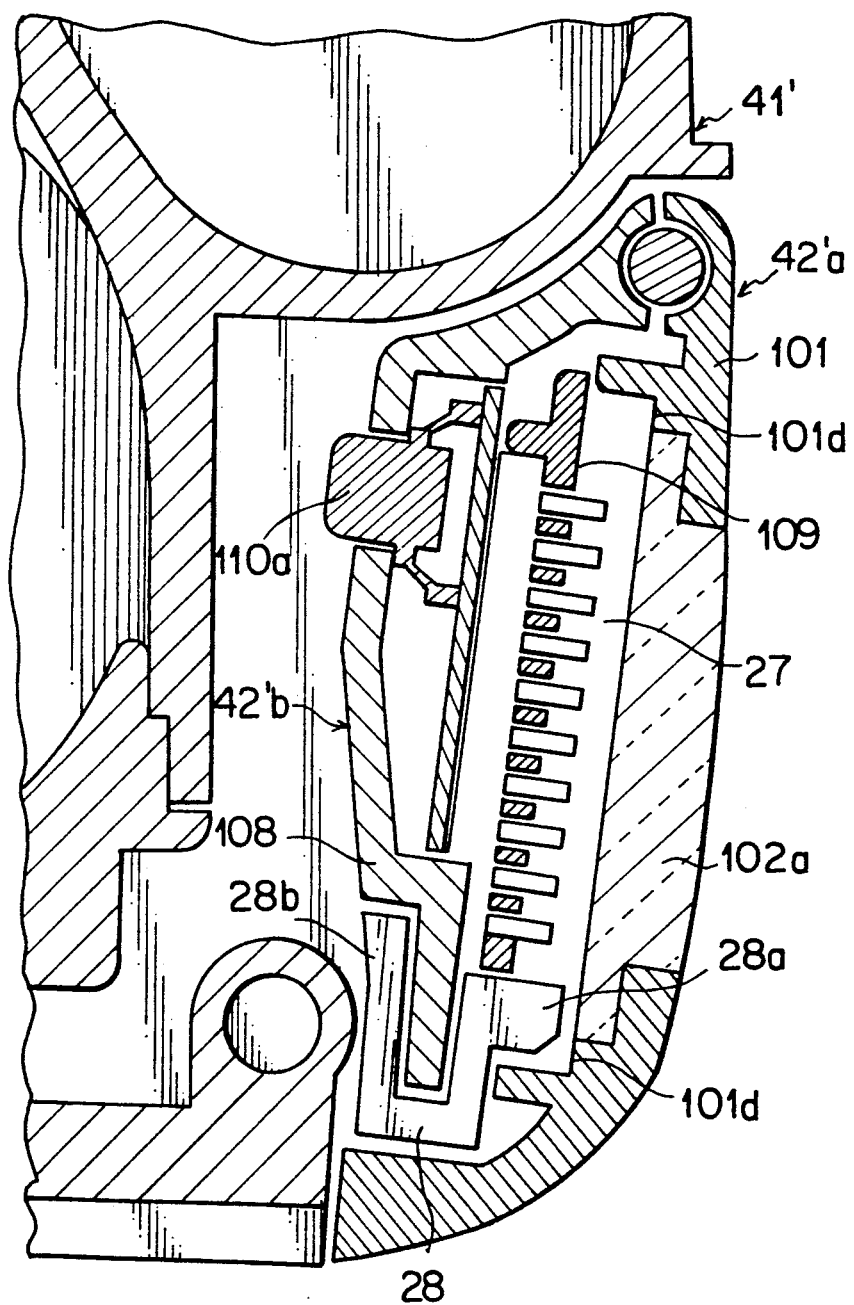
FIG. 18 is an enlarged horizontal sectional view taken along line XVIII—XVIII of FIG. 17 showing the card container device of FIG. 16 at a closed position.

Referring now to FIGS. 13 and 16 to 18, there is shown an exemplary form of the ejecting mechanism shown in FIG. 12. The ejecting mechanism is applied to a camera in which there is employed a card container device similar to the card container device shown in FIGS. 1 to 8 except that an inner lid unit 42b and an out lid unit 42a are integrally secured. Therefore, the lid units are indicated as an inner portion 42'b and an outer portion 42'a, respectively. The ejecting mechanism includes a card ejector 28 for ejecting an IC card from its loaded position. The card ejector 28 is mounted for upward and downward movement on the inner portion 42'b of a card container device and normally urged in the downward direction in FIGS. 13, 16 and 17 by means of a spring not shown. As particularly seen in FIG. 18, the card ejector 28 has a card pushing up portion 28a located on an inner face adjacent a free end edge of a switch cover member 108, and a manually operable portion 28b connected to the card pushing up portion 28a and located on the opposite face adjacent the free end edge of the switch cover member 108. The card ejector 28 is thus mounted for upward and downward sliding movement along the free end edge of the switch cover member 108 and is normally held at its lowermost position by the downward urging force of the spring not shown as seen in FIG. 17. The card pushing up portion 28a of the card ejector 28 extends into a gap or card chamber 27 defined between a card contact member 109 and a transparent display window member 102a of an outer lid 101 so that it may engage with a lower end of an IC card inserted in the card chamber 27 as can be seen in FIG. 16.

An IC card 20 is loaded in position into the gap or card chamber 27 between the contact cover member 109 and the display window member 102a from an insertion opening formed at an upper portion of the gap or card chamber 27. When the IC card 20 is to be ejected from the loaded position the card ejector 28 is manually operated at the manually operable portion 28b thereof and thus moved upwardly in FIG. 13, 16 or 17. Thereupon, the card pushing up portion 28a of the card ejector 28 is engaged with the lower end of the IC card 20 to push up the IC card 20 from the loaded position to an ejected position defined by an abutting edge 109f of the contact cover member 109 which is engaged with the card ejector 28. At the ejected position, the IC card extends upwardly from the card chamber 27 or the insertion opening by a distance which is sufficient to allow an operator to pick up an upper portion of the IC card 20 but will not allow the IC card 20 to be dropped from the card container device.

During such ejecting movement of the IC card 20, the friction finger 109e described hereinabove of the contact cover member 109 shown in FIG. 13 frictionally contacts with a surface of the IC card 20 to prevent the IC card 20 from being jumped out from the card container device by the urging force produced by resiliency of the contacts 112a or 112c of the card contact member 112.

If the card ejector 28 is released after then, then the card ejector 28 is retracted downwardly to its normal position by the urging force of the spring not shown to allow subsequent loading of an IC card.

Figure 19A:
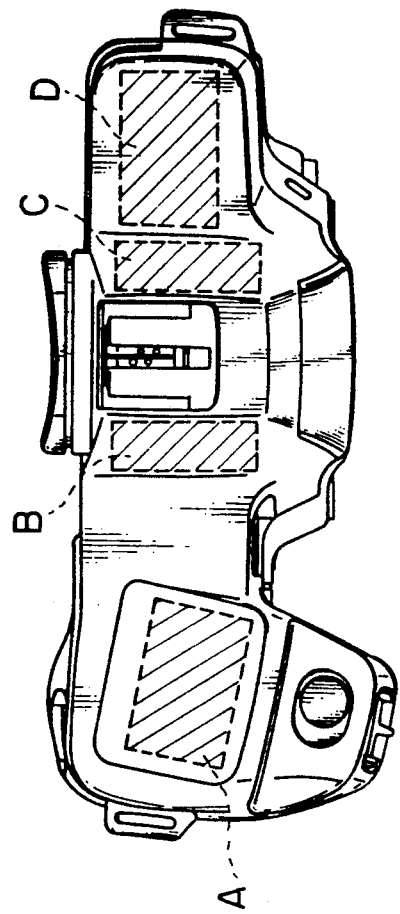
FIGS. 19a, 19b, 19c, 19d, 19e and 19f are a top plan view, a left-hand side elevational view, a front elevational view, a right-hand side elevational view, a bottom plan view and a rear elevational view, respectively, of a single lens reflex camera on which an IC card can be mounted.
Figure 19C:
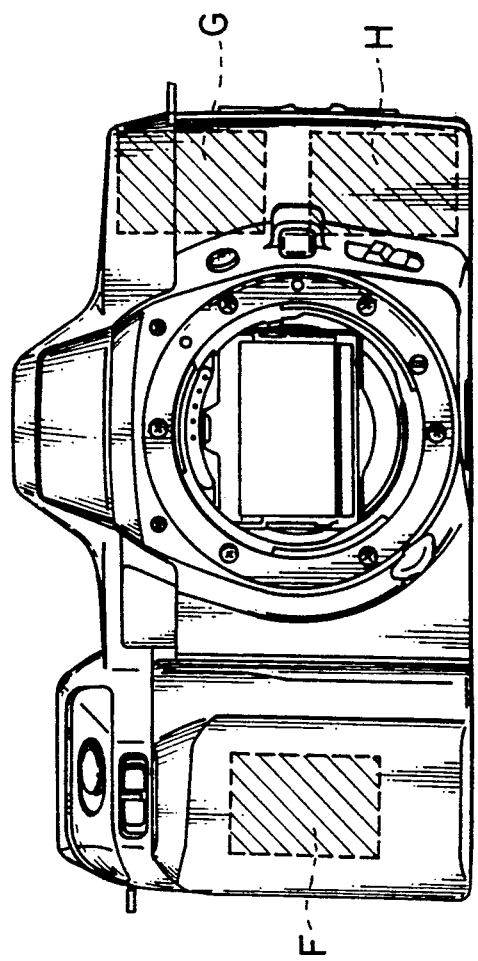
Figure 19B:
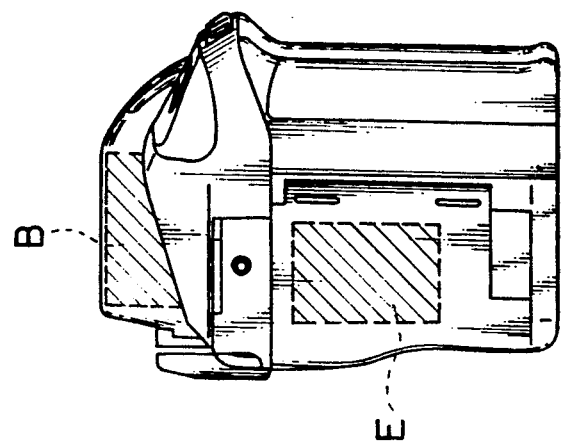
Figure 19E:
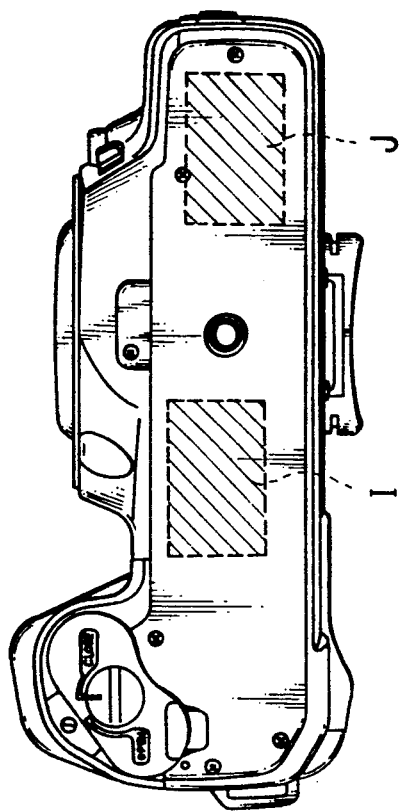
Figure 19F:
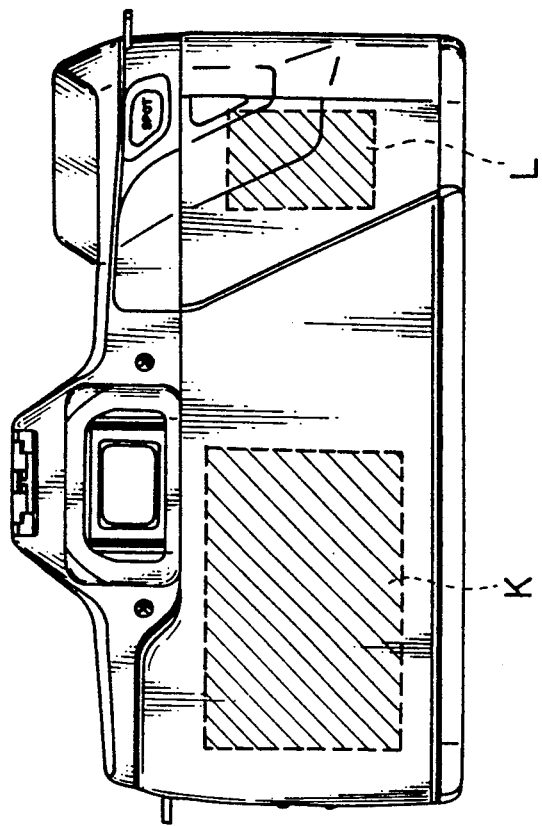

Referring now to FIGS. 19a to 19f, there is shown a single lens reflex camera in which an IC card such as the IC card 20 shown in FIG. 11 can be removably loaded. Each of hatched areas in FIGS 19a to 19f indicates a location of a surface of the camera at which an IC card having an individually suitable size can be removably mounted without changing the configuration of the camera. In particular, as shown in FIG. 19a, on the top of the camera, an IC card can be mounted on a surface of the camera at any of a location A of an upper portion of the camera on the take-up side (i.e., a film take-up spool chamber is located at this side). another location B of an inclined portion on the take-up side of a projected portion of the camera in which a pentagonal roof prism not shown is accommodated, a further location C of another inclined portion on the rewind side (i.e., a film cartridge chamber is located at this side) of the projected portion, and a still further location O of another upper portion of the camera on the rewind side. Meanwhile, on a side wall of the camera as viewed from the grip section side of the camera shown in FIG. 19b, an IC card can be mounted on the surface of the camera at a location E of a take-up side portion of the grip section of the camera in addition to the location B, and on the front side of the camera, as shown in FIG. 19c, an IC card can be mounted at any of a location F of a take-up side front portion of the grip section, another location G of an upper portion of the rewind side front portion, and a further location H of a lower portion of the rewind side front portion. Further, on a lower cover section of the camera, as shown in FIG. 19e, an IC card can be mounted on the surface of the camera at either of a location I of a lower portion adjacent the take-up side and another location J of a lower portion on the rewind side, and on a rear lid section of the camera, as shown in FIG. 19f, an IC card can be mounted at either of a location K of the rear lid section and another location L of the rear lid grip section.

An IC card to be mounted on a camera is preferably small in size, but it is advantageous from a point of view of prevention of loss and facility in handling that an IC card has a size of 20 mm × 30 mm to 40 mm × 80 mm or so and a thickness of about 1.9 mm. With such configuration, an IC card can be mounted at a location selected from a maximum possible number of locations on a surface of a camera.

Figure 20A:
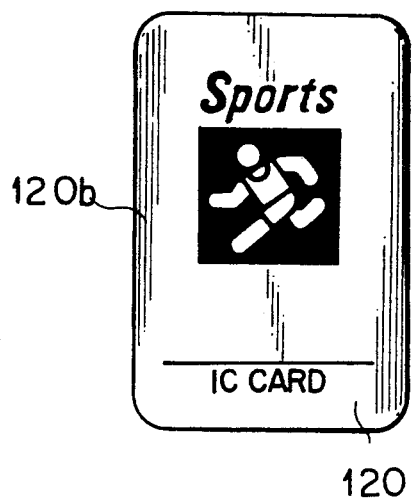
FIGS. 20a and 20b are a front elevational view and a rear elevational view, respectively showing an IC card for use with the camera shown in FIGS. 19a to 19f.
Figure 20B:
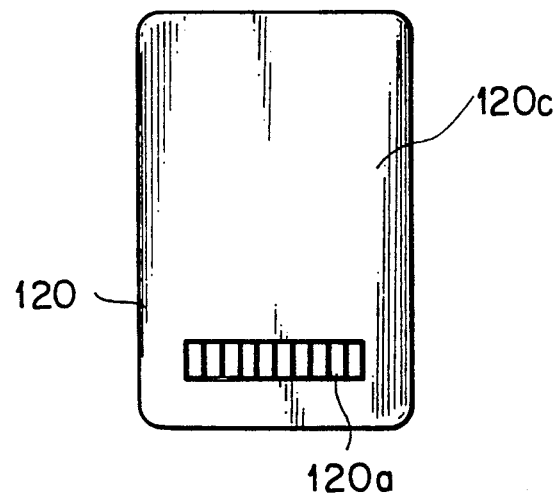

Referring now to FIGS 20a and 20b, there is shown an exemplary IC card for use with such camera as described above. The IC card generally denoted at 120 has such front and rear surfaces 120b and 120c as shown in FIGS. 20a and 20b, respectively. In particular, the front surface 120b of the IC card 120 has thereon a graphical indication from which a user can recognize a program relating to the card 120 and/or a type or contents of the card 120 and/or an indication of a title of contents of the card 120 as seen in FIG. 20a. Meanwhile, the rear surface 120c of the IC card 120 has a plurality of connecting contacts 120a at a location thereof near a longitudinal end of the IC card 120 as seen in FIG. 20b. The connecting contacts 120a are arranged in a row extending perpendicularly to the longitudinal direction of the IC card 120. A portion of the rear surface 120c of the IC card 120 above the connecting contacts 120a remains blank or white so that a user may write some memos on the rear surface portion using some suitable pen.

Since the connecting terminals 120a are arranged in a horizontal row near the longitudinal end of the IC card 120, a user can handle the IC card 120 without touching with the connecting terminals 120a. Further as contacts for contacting with the connecting contacts 120a of the IC card 120 are disposed at an interior location of such a card container device as described hereinabove, when a user is to insert the IC card 120 in the axial direction and load the same in position into the device, the connecting contacts 120a of the IC card 120 will not touch with any irrelevant portion of the device, and accordingly, the IC card 120 can be loaded correctly.

Figure 20C:
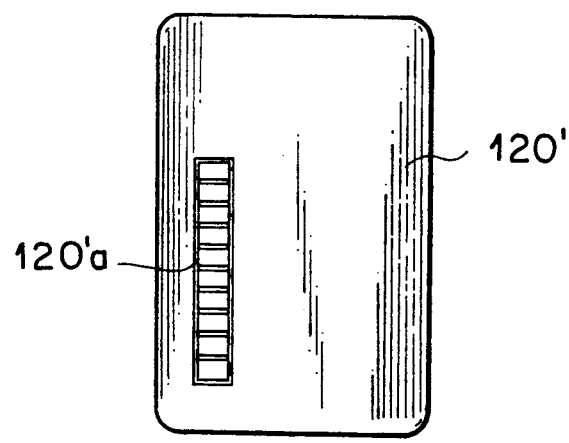
FIG. 20c is a similar view to FIG. 20b but showing a modified IC card.

FIG. 20c shows a rear surface of another exemplary IC card. The IC card shown is denoted at 120' and may F have such a front surface as shown in FIG. 20a. In the IC card 120', a plurality of connecting contacts 120'a are arranged in a vertical column along a longitudinal edge of the IC card 120'. Thus also the IC card 120' has a blank or white portion at which the connecting contacts 120'a are not provided. Accordingly, the IC card 120' can be handled without touching with the connecting contacts 120'a, and a graphical indication or an indication of a title or the like can be provided at the blank portion of the IC card 120'.

Where the IC card has a size of about 20 mm × 80 mm to 40 mm × 60 mm and a thickness of 1.9 mm and particularly a size of 20 mm × 30 mm a card accommodating section for accommodating such IC card can be provided at a flat surface portion of a camera having a comparatively large area without modifying the configuration of the camera at present. Meanwhile, the IC card has a sufficient size to permit the same to have minimum elements arranged thereon which are required to be arranged on the same such as a ROM IC, bonded wires and contacts.

Figure 21A:
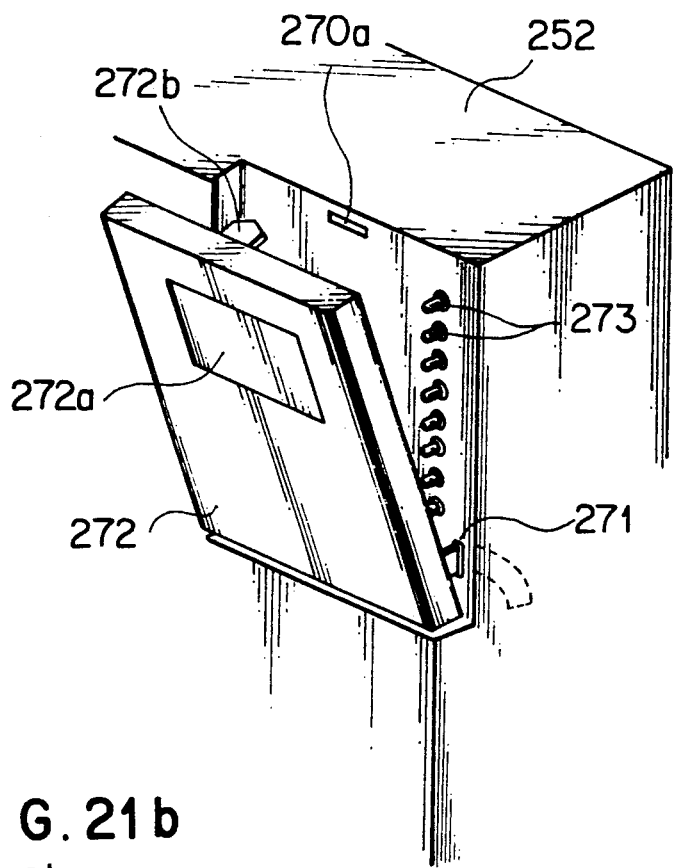
FIGS. 21a, 21b and 21c are a perspective view, a vertical sectional view and a horizontal sectional view, respectively, showing a card accommodating case.
Figure 21B:
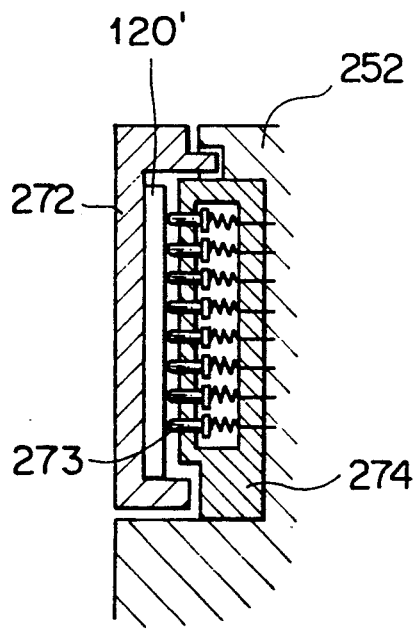
Figure 21C:
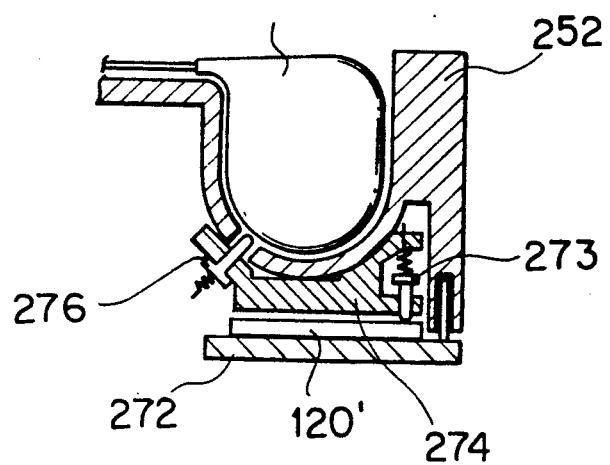

Referring now to FIGS 21a to 21c, there is shown a card accommodating section for accommodating an IC card therein. Here, such IC card 120' as shown in FIGS. 20a and 20c is used for the accommodating section. The card accommodating section is provided at a location G of the upper portion of the rewind side front portion of the camera shown in FIG. 19c. The card accommodating section includes a card accommodating section cover 272 mounted at a lower end thereof on a body 252 of a camera for pivotal motion toward and away from the camera body 252 under the guidance of a pivotal guide 271 as seen in FIG. 21a. The card accommodating section cover 272 has a transparent window member 272a through which an indication such as a graphical indication on the front surface 120'b of an IC card 120' loaded in position in the card accommodating section can be observed so that contents of the IC card 120' may be known to a user from outside the camera. A plurality of card contacts 273 are disposed on the camera body 252 in an opposing relationship to the connecting contacts 120'a provided on the IC card 120' loaded in position. The card contacts 273 are mounted in a row on a contact holder 274 secured to the camera body 252 as shown in FIG. 21b. The contact holder 274 has, in addition to the card contacts 273, CAS contacts 278 supported thereon in an opposing relationship to a film magazine chamber 275 of the camera for reading out film sensitivity information coded on a film magazine as shown in FIG. 21c. In this instance, the IC card 120' is accommodated between the card accommodating section cover 272 and the opposing camera body 252 and is thus loaded in position in the camera body 252 with an arresting portion 272b of the card accommodating section cover 272 engaged with an engaging hole 270a formed in the camera body 252.

Figure 22A:
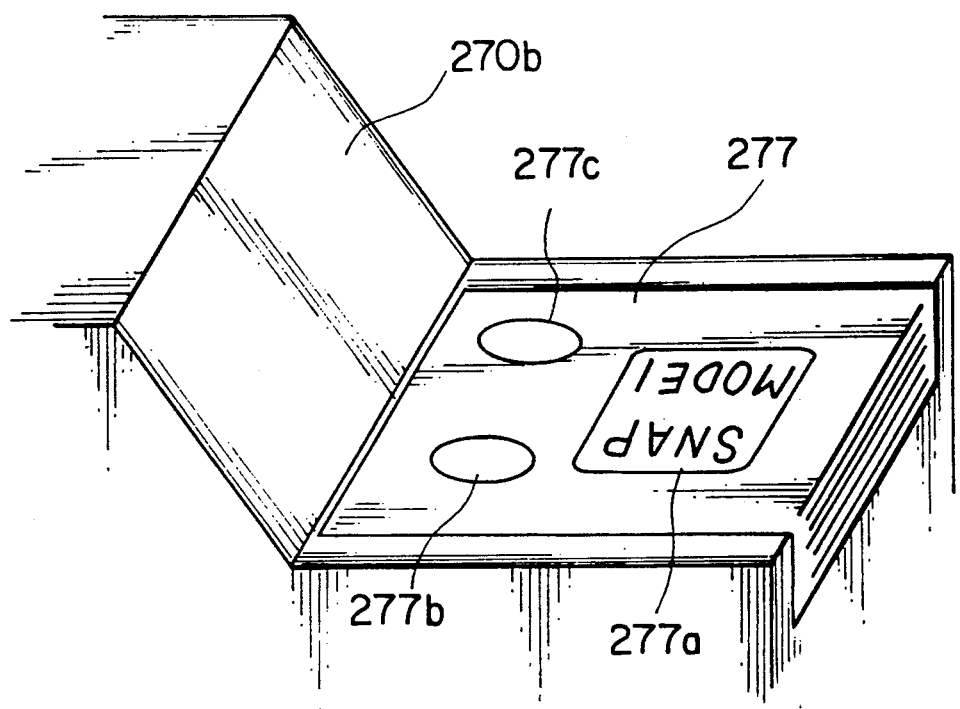
FIGS. 22a and 22b are perspective views showing another card accommodating case at different positions.
Figure 22B:
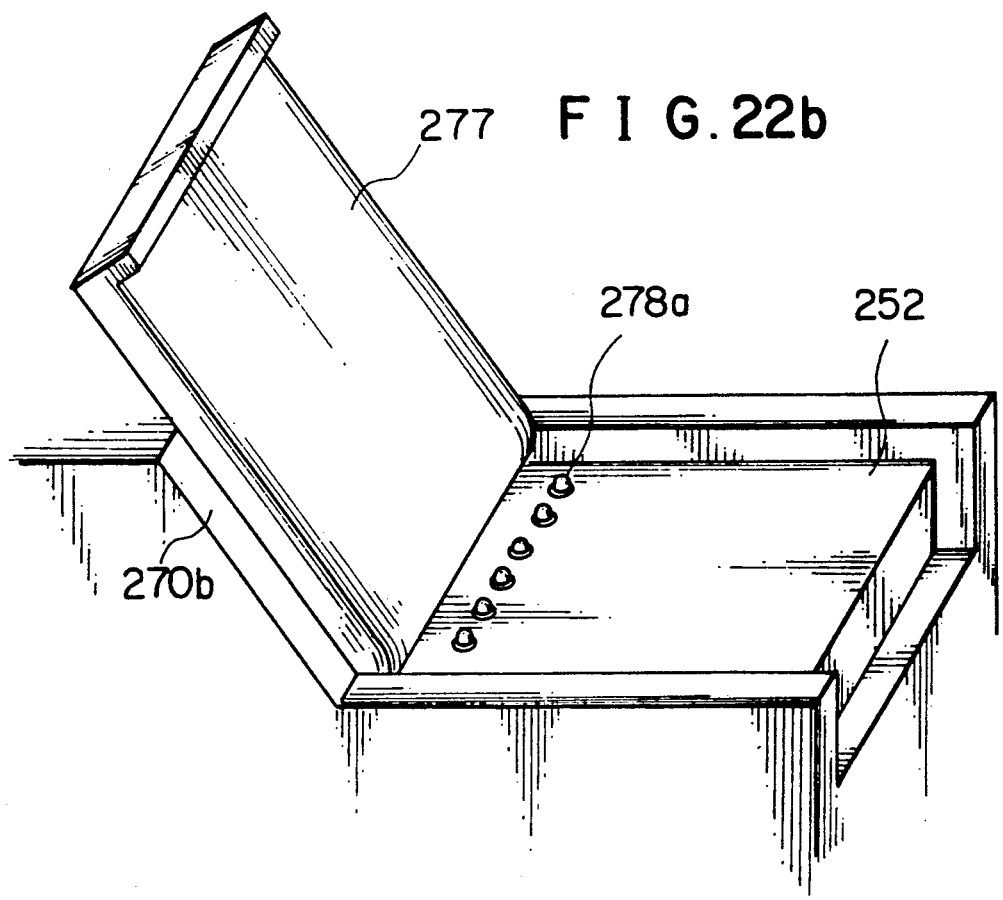
Figure 22C:
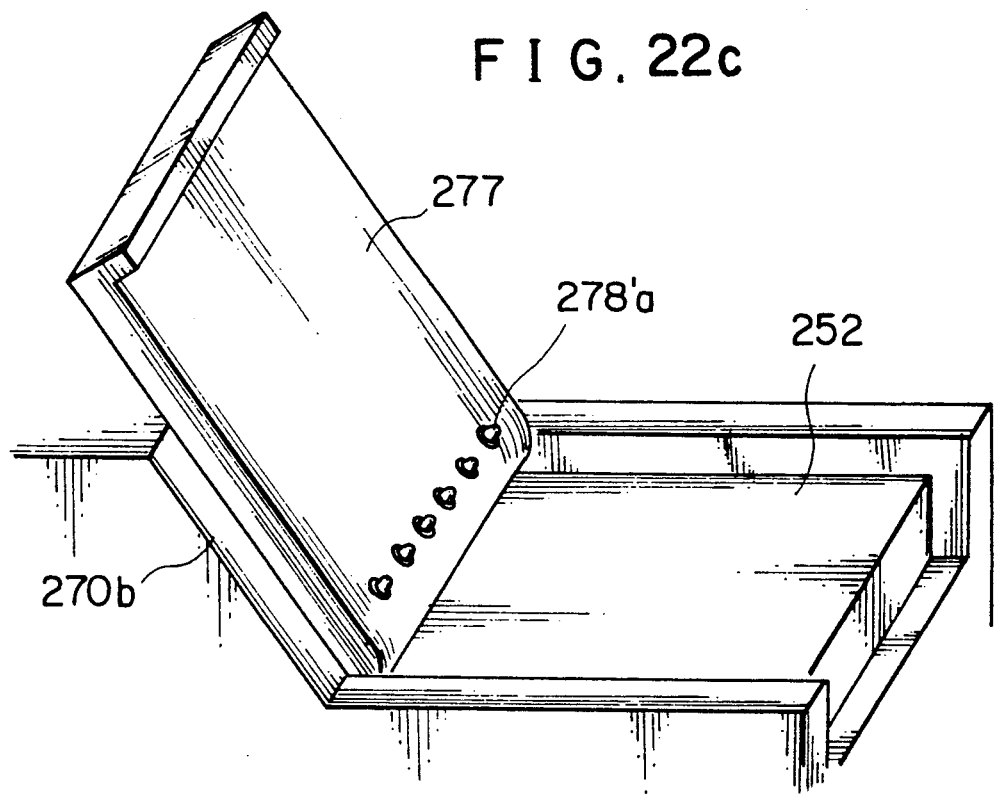
FIG. 22c is a view similar to FIG. 22b but showing a modified card accommodating case.

FIGS. 22a to 22c show a card accommodating section disposed at the location D of the upper portion of the camera on the rewind side shown in FIG. 19a. Here, such IC card 120 or 120' as shown in FIGS. 20a and 20b or in FIGS. 20a and 20c is used. The card accommodating section includes a card accommodating section cover 277 which has a liquid crystal display device (LCD) 277a disposed on an upper face thereof as shown in FIG. 22a. When an IC card 120 is loaded in position in the card accommodating section, a type and contents of the IC card 120 are indicated on the LCD 277a. Further, a pair of operation switches 277b and 277c for selecting a particular one of a plurality of camera body control modes in the IC card 251 are provided on the card accommodating section cover 277. Card contacts for contacting with the connecting contacts 120a of an IC card 120 may be provided on the camera body 252 side as at 278a shown in FIG. 22b or on the card accommodating section cover 277 side as at 278'a shown in FIG. 22c. In FIG. 22a, reference character 270b denotes a projected portion of the camera in which a pentagonal roof prism not shown is accommodated.

In this instance, the card accommodating section cover 277 is mounted for pivotal motion around an axis at a bottom side location of the projected portion 270b of the camera in which the pentagonal roof prism is accommodated. Thus, an IC card 120 or 120' can be loaded in position by placing the same in position on the camera body 252 and pivoting the card accommodating section cover 277 to such a position as shown in FIG. 22a.

Figure 19D:
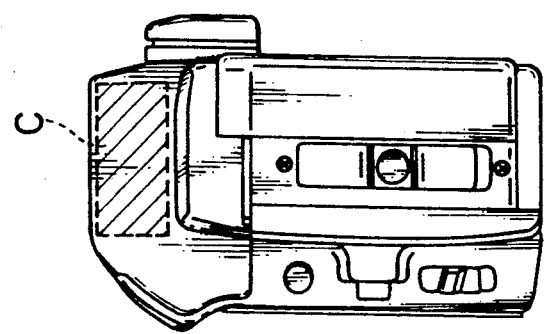

FIGS. 23a and 23b show a card accommodating section disposed at the location C of the inclined portion on the rewind side of the projected portion of the camera shown in FIGS. 19a and 19d in which the pentagonal roof prism is accommodated. Here, such IC card 120 or 120' as shown in FIGS. 20a and 20b or in FIGS. 20a and 20c is used. The card accommodating section shown includes a card accommodating section cover 279 located on an inclined face 270b₁ on the rewind side of the projected portion 270b as shown in FIG. 23a. The card accommodating section cover 279 is mounted for pivotal motion around an axis at a bottom side location of the inclined face 270b₁ of the projected portion 270b between such an upper position as seen in FIG. 23a in which it is positioned on the inclined face 270b₁ of the projection portion 270b and a lower position as seen in FIG. 23b in which it lies on the upper surface of the camera body 252 on the rewind side. The card accommodating section cover 279 has a card receiving portion 279a formed on an upper face thereof at its lower position. Thus, an IC card 120 or 120' can be loaded in position on the camera body 252 by placing the same in position on the card receiving portion 279a of the card accommodating section cover 279 at the lower position with the connecting contacts 120a or 120'a of the IC card 120 or 120' directed upwardly and then pivoting the card accommodating section cover 279 in the direction indicated by an arrow mark in FIG. 23b to the upper position. A plurality of card contacts 280 are provided on the inclined face 270b₁ of the projected portion 270b of the camera body 252 in an opposing relationship to the connecting terminals 120a or 120'a of the IC card 120 or 120'.

A card accommodating section disposed at the location J of the lower cover section of the camera body shown in FIG. 19e is shown in FIGS. 24a to 24c. Referring to FIGS. 24a to 24c, the card accommodating section shown includes a card accommodating section case 282 mounted for sliding movement along a recessed portion formed on a lower cover section 281 of the camera body 252. The card accommodating section case 282 can thus be pulled out rightwardly from a position shown in FIG. 24a to another position shown in FIG. 24b or 24c in which an IC card 120 or 120' can be accommodated into the card accommodating section case 282. The IC card 120 or 120' is normally urged upwardly by a spring plate 282a mounted on the card accommodating section case 282. Accordingly, when the card accommodating section case 282 is pushed to move to the position shown in FIG. 24a, the connecting contacts 120a or 120'a of the IC card 120 or 120' are resiliently pressed against or contacted with card contacts 283 provided on the bottom of the lower cover section 281 of the camera body 252. The IC card 120 or 120' is loaded in position in the card accommodating section in this manner.

Figure 25A:
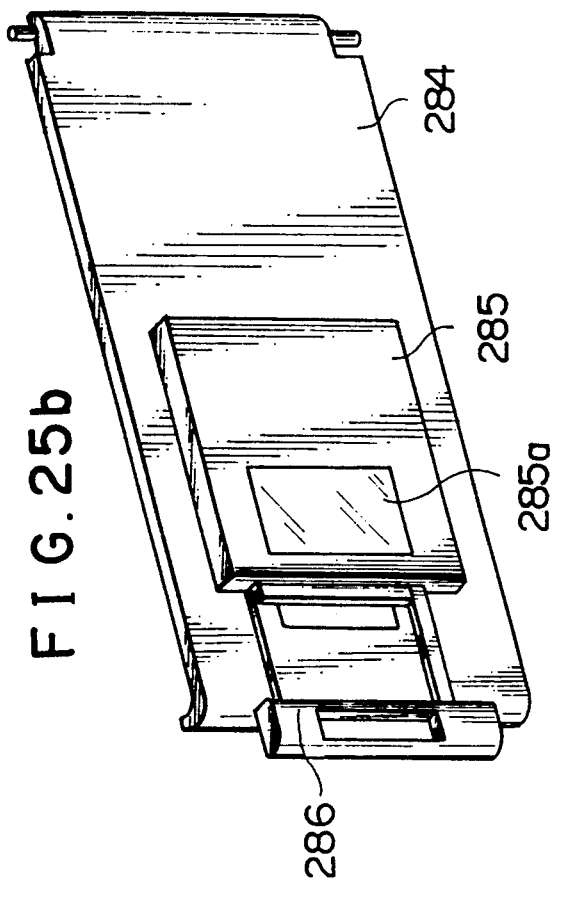
FIGS. 25a and 25b are perspective views showing a yet further card accommodating case at different positions.
Figure 25B:
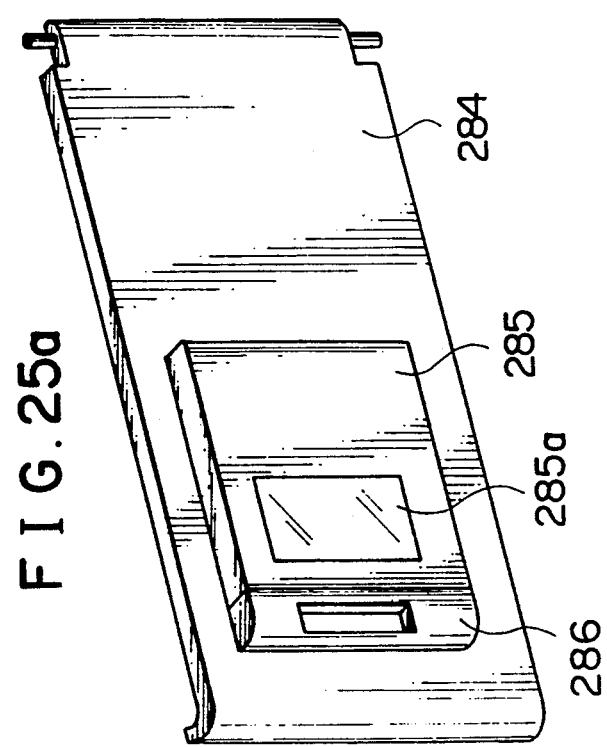
Figure 25C:
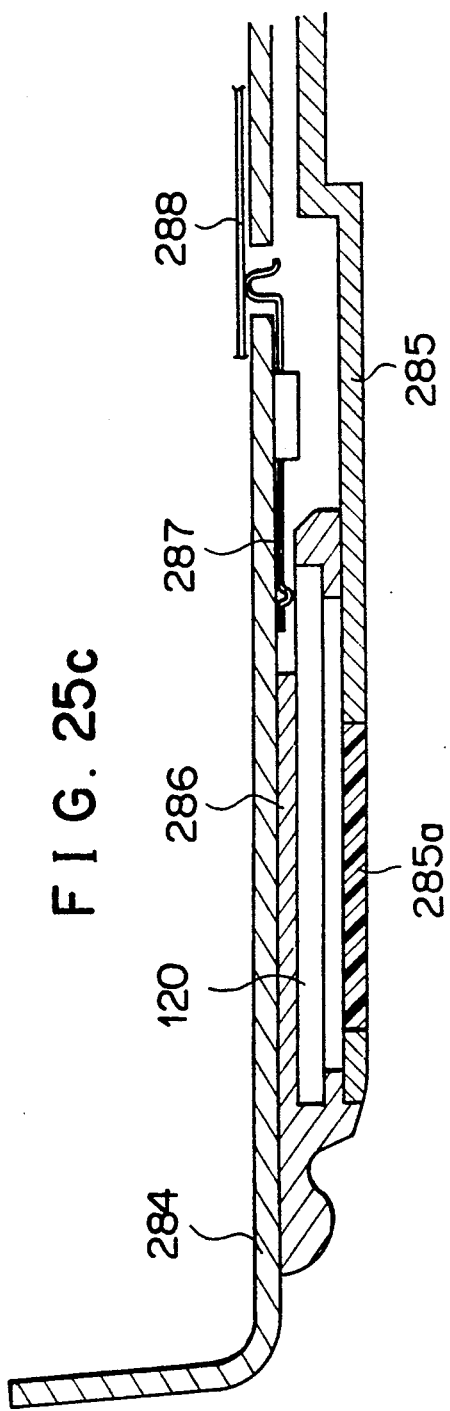
FIG. 25c is a horizontal sectional view showing detailed structure of the card accommodating case.

FIGS. 25a to 25c show a card accommodating section disposed at the location K of the rear lid section of the camera body as shown in FIG. 19f. Referring to FIGS. 25a to 25c, the card accommodating section is generally denoted at 285 and is formed in an integral relationship on a rear lid section 284 of the camera body 252. A card loading member 288 is fitted for sliding movement in the card accommodating section 285 such that it may be inserted into the card accommodating section 285 through an insertion opening formed at a left end portion of the card accommodating section 285.

The card loading member 288 has a holding portion on which an IC card 120 or 120' can be mounted, and a grip portion provided at an end of the holding portion. Meanwhile, the card accommodating section 285 has a transparent window member 285a formed at a location thereof opposing to an IC card 120 or 120' loaded in position in the card accommodating section 285 so that an indication on a surface of the IC card 120 or 120' can be visually observed through the window member 285a. Further, a plurality of card connecting contacts 287 are provided on the rear lid section 284 for contacting with the connecting contacts 120a or 120'a on the rear surface of an IC card 120 or 120' loaded in position. The other ends of the card connecting contacts 287 on the rear lid section 284 are held in contact, when the rear lid section 284 is mounted in position on the camera body 252, with a flexible circuit board 288 for connection with the camera body 252 as shown in FIG. 25c.

Figure 26A:
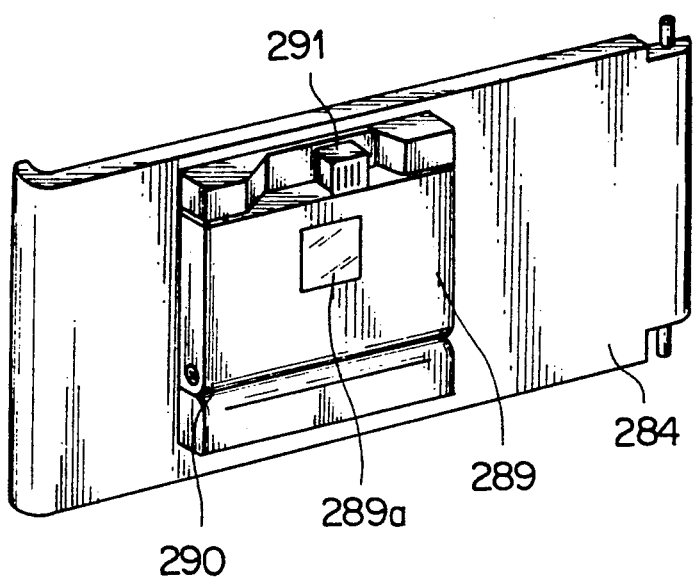
FIGS. 26a and 26b are a perspective view and a sectional view, respectively, showing a yet further card accommodating case.
Figure 26B:
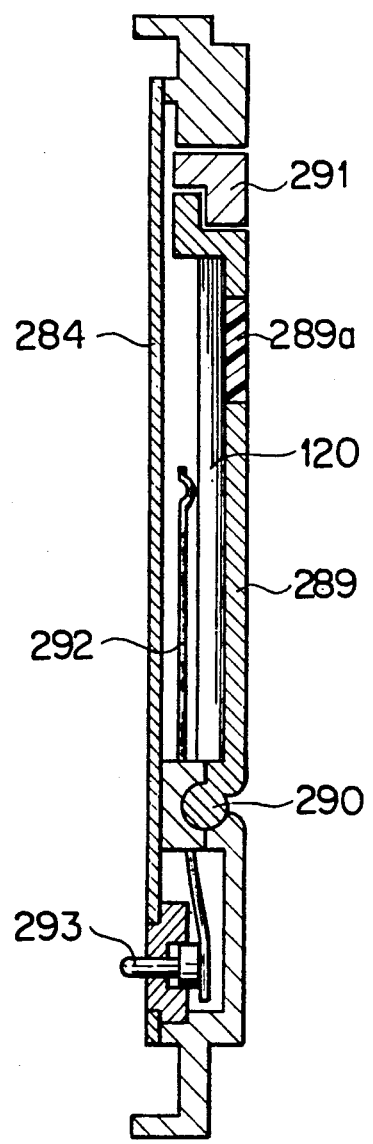

FIGS. 26a and 26b show another card accommodating section disposed at the location K of the rear lid section of the camera body as shown in FIG. 19f. Referring to FIGS. 28a and 26b, the card accommodating section includes a card accommodating section case 289 mounted for pivotal motion on the rear lid section 284 of the camera body 252 between a closed position shown in FIG. 26a in which it lies on the rear lid section 284 and another open position in which a free end thereof is spaced away from the rear lid section 284. An IC card 120 or 120' can thus be loaded in position into the card accommodating section by mounting the same onto the card accommodating section case 289 at its open position and pivoting the card accommodating section case 289 to the closed position.

In particular, as apparently seen from FIG. 26b, the card accommodating section case 289 is supported for pivotal motion around a hinge 290 on the rear lid section 284. As shown in FIG. 26a, an unlocking knob 291 is provided at an upper portion of the card accommodating section case 289 for canceling a locked condition between the card accommodating section case 289 at the closed position and the rear lid section 284 of the camera body 252. Thus, by manual operation of the unlocking knob 291, the card accommodating section case 289 can be pivoted from the closed position to the open position at which an IC card 120 or 120' can be placed onto the card accommodating section case 289. A plurality of card connecting contacts 292 are supported on a portion close to the hinge 290 provided on the rear lid section 284. One ends of the card connecting contacts 292 are disposed for contacting engagement with the connecting terminals 120a or 120'a of an IC card 120 or 120' loaded in position while the other ends of the card connecting contacts 292 are held in contact with connecting terminals 293 for connection with connecting terminals on the camera body 252. The card accommodating section case 289 has a transparent window member 289a formed thereon so that an indication on the front surface 120b of an IC card 120 or 120' loaded in position may be visually observed therethrough.

Having now fully described the invention, it will be apparent to one of ordinary skill in the art that many changes and modifications can be made thereto without departing from the spirit and scope of the invention as set forth herein.

What is claimed is:

1. A card which stores photographic information for use with a camera having a card accommodating device which includes a card accommodating section for removably accommodating therein said card, the card accommodating device including a transparent cover member and a plurality of electrical contacts spaced on an opposite side of the card, accommodating section from the transparent cover member, said card comprising:

a rectangular plate defined by a pair of opposite surfaces and four edge portions;

an indication portion on which contents of said card are indicated which is provided on one of said surfaces such that it is adjacent the transparent cover member when said card is accommodated in the card accommodating section to permit observation of said indication portion through the transparent cover member; and a plurality of connecting terminals provided on the other of said surfaces in a row near and along one of said edge portions for electrical connection to the electrical contacts of the card accommodating device.

2. A card as claimed in claim 1, wherein said other surface of said rectangular plate includes sufficient spacing to allow information to be written thereon.

3. A card as claimed in claim 2, said card having a size between about 20 mm × 30 mm and 40 mm × 60 mm, so that it may be mounted on the camera.

4. A card as claimed in claim 1, wherein said card is a IC card.

5. A card as claimed in claim 1, wherein said card stores photographic information to be transmitted from said card to the camera.

6. A single lens reflex camera having a pentagonal roof prism accommodating section and a film chamber lid for opening and closing a film chamber, comprising:

a card accommodating section, located beside said prism accommodating section on the top of said camera, for accommodating therein a card, which stores photographic information; and a card lid member supported for pivotal motion between a closed and an open position for closing and opening said card accommodating section, said card lid member forming a part of the top of the camera when it is in the closed position.

7. A single lens reflex camera as claimed in claim 6, wherein said card accommodating section is adapted to accommodate a card of a size between about 20 mm × 30 mm and 40 mm × 60 mm.

8. A camera as claimed in claim 6, wherein the card is a IC card.

9. A camera as claimed in claim 6, wherein the card stores photographic information to be transmitted from the card to said camera.

10. A camera having a film chamber lid for opening and closing a film chamber and for defining a rear face of the camera when the film chamber is closed, comprising:

a card accommodating section, located on a side end portion of a bottom face of said camera, for removable accommodating therein a card which stores photographic information, and a card receiving case for receiving the card, wherein said card receiving case is supported or sliding movement between a first position in which said receiving case is positioned below the bottom of said camera so that the card is accommodated in said accommodating section and a second position in which said receiving case extends laterally from the bottom of said camera.

11. A camera as claimed in claim 10, wherein said card accommodating section is adapted to accommodate a card of a size between about 20 mm × 30 mm and 40 mm × 60 mm.

12. A camera as claimed in claim 10, wherein the card is a IC card.

13. A camera as claimed in claim 10, wherein the card stores photographic information to be transmitted from the card to said camera.

14. A camera having a film chamber lid for opening and closing a film chamber, comprising:

a card accommodating section located on an outer face of said film chamber lid for accommodating therein a card which stores photographic information; and a card holding case for holding the card, wherein said card holding case is supported for sliding movement along said outer face of said lid between a first position in which said holding case is received in said accommodating section so that the card is accommodated in said accommodating section and a second position in which said holding case extends outwardly from said accommodating section.

15. A camera as claimed in claim 14, wherein said card accommodating section is adapted to accommodate a card of a size between about 20 mm × 30 mm and 40 mm × 60 mm.

16. A camera as claimed in claim 14, wherein the card is a IC card.

17. A camera as claimed in claim 14, wherein the card stores photographic information to be transmitted from the card to said camera.

18. A camera having a film chamber lid for opening and closing a film chamber, comprising:
- a card accommodating section located on an outer face of said film chamber lid for accommodating therein a card which stores photographic information; and
- a card lid member supported for pivotal motion on said film chamber lid between a closed and an open position for closing and opening said accommodating section so that said card is accommodated in said accommodating section.

19. A camera as claimed in claim 18, wherein said card accommodating section is adapted to accommodate an card of a size between about 20 mm × 30 mm and 40 mm × 60 mm.

20. A camera as claimed in claim 18, wherein the card is a IC card.

21. A camera as claimed in claim 18, wherein the card stores photographic information to be transmitted from the card to said camera.

22. A card accommodating device having a card accommodating section or removable accommodating therein a card which stores photographic information, which has a rectangular plate shape defined by a pair of surfaces and four edge portions, and which includes both an indication portion provided on one of the pair of surfaces on which contents of said card are indicated, and a plurality of connecting terminals provided on the other of the pair of surfaces in a row near and along one of the edge portions for electrical connection, comprising:
- a lid member for opening and closing said accommodating section, said lid member having an opening formed therein at a position corresponding to the indication portion of the card;
- a transparent cover member fitted in said opening of said lid member so as to permit observation of the indication portion therethrough when the card is accommodated in the card accommodating section; and
- a plurality of electrical contacts provided in said accommodating section at a position corresponding to the connecting terminals for connection with said connecting terminals.

23. A card accommodating device as claimed in claim 22, wherein the card is a IC card.

24. A card accommodating device as claimed in claim 22, wherein the card stores photographic information to be transmitted from the card to said card accommodating device.

25. A camera having a film chamber lid for opening and closing a film chamber, comprising:
- a card accommodating section located on an outer face of a rear side of said camera for accommodating therein a card which stores photographic information; and
- a holding case for holding the card, wherein said card holding case is supported for sliding movement along said outer face of a rear side of said camera between a first position in which said holding case is received in said accommodating section so that the card is accommodated in said accommodating section and a second position in which said holding case extends outwardly from said accommodating section.

26. A camera as claimed in claim 25, wherein said card accommodating section is adapted to accommodate a card of a size between about 20 mm × 30 mm and 40 mm × 50 mm.

27. A camera having a film chamber lid for opening and closing a film chamber,
- a card accommodating section located on an outer face of said film chamber lid for accommodating therein a card which stores photographic information; and
- a card lid member supported for pivotal motion on said outer face of said rear side of said camera between a closed and an open position for closing and opening said accommodating section so that said card is accommodated in said accommodating section.

28. A camera as claimed in claim 27, wherein said card accommodating section is adapted to accommodate a card of a size between about 20 mm × 30 mm and 40 mm × 60 mm.

29. A camera having a film chamber lid on a first face of said camera for opening and closing a film chamber, comprising:
- a card accommodating section, located on a side end portion of a second face of said camera, for removably accommodating therein a card which stores photographic information; and
- a card receiving case for receiving the card, wherein said card receiving case is supported for sliding movement along said second face between a first position in which said receiving case is positioned so that the card is accommodated in said accommodating section and a second position in which said receiving case extends from said first position so that the card is removed from said accommodating section.

30. A camera having a film chamber lid for opening and closing a film chamber, comprising:
- a card accommodating section, located on an outer face of a bottom of said camera, for removably accommodating therein a card which stores photographic information; and
- a card receiving case for receiving the card, wherein said card receiving case is supported for sliding movement between a first position in which said receiving case is positioned on said bottom of said camera so that the card is accommodated in said accommodating section, and a second position in which said receiving case extends laterally from said bottom of said camera.

31. A card which stores information for use with a camera having a card accommodating device which includes a card accommodating section for removably accommodating therein said card, a plurality of electrical contacts, and a lid member for opening and closing the card accommodating section, at least a part of the lid member including a transparent cover member, said card comprising:
- a rectangular plate defined by a pair of opposite surfaces and four edge portions;
- an indication portion, on which contents of said card are indicated, provided on one of said surfaces such that it is adjacent the transparent cover member when said card is accommodated in the card accommodating section to permit observation of said indication portion through the transparent cover member; and a plurality of connecting terminals provided along one of said edge portions for electrical connection to the electrical contacts of the card accommodating device.

32. A card as claimed in claim 31, wherein said card is an IC card.

33. A card as claimed in claim 31, said card having a size between about 20 mm×30 mm and 40 mm×60 mm, so that it may be mounted on the camera.

34. A card as claimed in claim 31, wherein the lid member is supported for pivotal motion between a closed and an open position for closing and opening the card accommodating section so that said card may be accommodated in the accommodating section.

35. A card which stores information for use with a camera having a card accommodating device which includes a card accommodating section or removably accommodating therein said card, the card accommodating device including a transparent cover member and a plurality of electrical contacts, said card comprising:

a rectangular plate defined by a pair of opposite surfaces and four edge portions;

an indication portion, on which contents of said card are indicated, provided on one of said surfaces such that it is adjacent the transparent cover member when said card is accommodated in the card accommodating section to permit observation of said indication portion through the transparent cover member; and a plurality of connecting terminals provided along one of said edge portions for electrical connection to the electrical contacts of the card accommodating device.

36. A card as claimed in claim 35, wherein said card is an IC card.

37. A card as claimed in claim 35, said card having a size between about 20 mm×30 mm and 40 mm×60 mm, so that it may be mounted on the camera.

* * * * *